United States Patent
Remes et al.

(10) Patent No.: US 12,002,669 B2
(45) Date of Patent: *Jun. 4, 2024

(54) SYSTEMS AND METHODS OF ION POPULATION REGULATION IN MASS SPECTROMETRY

(71) Applicant: THERMO FINNIGAN LLC, San Jose, CA (US)

(72) Inventors: Philip M. Remes, Livermore, CA (US); Jesse D. Canterbury, Shoreline, WA (US)

(73) Assignee: Thermo Finnigan LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/163,008

(22) Filed: Feb. 1, 2023

(65) Prior Publication Data

US 2023/0178349 A1    Jun. 8, 2023

Related U.S. Application Data

(63) Continuation of application No. 17/459,752, filed on Aug. 27, 2021, now Pat. No. 11,594,404.

(51) Int. Cl.
*H01J 49/00* (2006.01)
*G01N 30/72* (2006.01)

(52) U.S. Cl.
CPC ...... *H01J 49/0036* (2013.01); *G01N 30/7206* (2013.01); *G01N 30/7233* (2013.01)

(58) Field of Classification Search
CPC ............ H01J 49/0036; G01N 30/7206; G01N 30/7233

USPC ........................................ 250/281, 282, 288
See application file for complete search history.

(56) References Cited

U.S. PATENT DOCUMENTS

| | | |
|---|---|---|
| 5,572,022 A | 11/1996 | Schwartz et al. |
| 6,987,261 B2 | 1/2006 | Horning et al. |
| 7,238,936 B2 | 7/2007 | Okamura et al. |
| 7,297,941 B2 | 11/2007 | Senko et al. |
| 7,312,441 B2 | 12/2007 | Land et al. |
| 7,323,682 B2 | 1/2008 | McCauley et al. |
| 7,638,763 B2 | 12/2009 | Guckenberger et al. |
| 7,880,136 B2 | 2/2011 | Makarov et al. |
| 7,943,899 B2 | 5/2011 | Senko |
| 7,960,690 B2 | 6/2011 | Schwartz et al. |

(Continued)

FOREIGN PATENT DOCUMENTS

WO    WO-2010138120 A1    12/2010

OTHER PUBLICATIONS

EP21217586.3, Extended European Search Report, dated May 30, 2022, 7 pages.

*Primary Examiner* — Michael Maskell
(74) *Attorney, Agent, or Firm* — Thomas F. Cooney

(57) ABSTRACT

A method comprises: obtaining, from a series of mass spectra including a most recent mass spectrum and a plurality of previously-acquired mass spectra, an elution profile comprising a plurality of detection points each representing intensity of ions accumulated over an accumulation time and detected by a detector as a function of time; classifying, based on a subset of detection points included in the plurality of detection points, a current signal state of the elution profile; and setting, for a next acquisition of a mass spectrum, the accumulation time based on the classified current signal state of the elution profile.

17 Claims, 17 Drawing Sheets

(56) References Cited

U.S. PATENT DOCUMENTS

| | | |
|---|---|---|
| 8,193,484 B2 | 6/2012 | Quarmby et al. |
| 8,552,365 B2 | 10/2013 | Wouters et al. |
| 9,165,755 B2 | 10/2015 | Remes et al. |
| 9,324,547 B2 | 4/2016 | Hauschild et al. |
| 9,812,307 B2 | 11/2017 | Makarov |
| 9,911,585 B1 * | 3/2018 | Zabrouskov ........ H01J 49/0031 |
| 10,128,099 B1 | 11/2018 | Schwartz et al. |
| 11,594,404 B1 * | 2/2023 | Remes ................... G01N 30/72 |
| 2008/0149821 A1 | 6/2008 | Senko |
| 2017/0370889 A1 * | 12/2017 | Remes ................... G16C 20/20 |
| 2020/0357627 A1 | 11/2020 | Peterson et al. |
| 2020/0371073 A1 | 11/2020 | Thoeing et al. |

* cited by examiner

SYSTEMS AND METHODS OF ION POPULATION REGULATION IN MASS SPECTROMETRY

CROSS-REFERENCE TO RELATED APPLICATION

The present application is a Continuation, under 35 U.S.C 120, of co-pending and co-assigned U.S. patent application Ser. No. 17/459,752, now U.S. patent Ser. No. 11/594,404, which was filed on Aug. 27, 2021, the disclosure of which is hereby incorporated by reference herein in its entirety.

BACKGROUND INFORMATION

A mass spectrometer is a sensitive instrument that may be used to detect, identify, and/or quantify molecules based on their mass-to-charge ratio (m/z). A mass spectrometer generally includes an ion source for generating ions from components included in the sample, a mass analyzer for separating the ions based on their m/z, and an ion detector for detecting the separated ions. The mass spectrometer may be connected to a computer-based software platform that uses data from the ion detector to construct a mass spectrum that shows a relative abundance of each of the detected ions as a function of m/z. The m/z of ions may be used to detect and quantify molecules in simple and complex mixtures. A separation device such as a liquid chromatograph (LC) or gas chromatograph (GC) may be coupled to the mass spectrometer (MS) in a combined system (e.g., LC-MS or GC-MS system) to separate components included in the sample before the components are introduced to the mass spectrometer.

For trapping-type mass analyzers, such as quadrupole ion traps and Orbitrap™ electrostatic trap mass analyzers (manufactured by Thermo Fisher Scientific of Waltham, MA), best analytical performance is often achieved when the number of ions analyzed is within a certain target range. Too few ions result in noisy spectra or the need to co-add multiple spectra, while too many ions can result in space-charge effects such as mass shifts, peak broadening, and coalescence. Beam-type instruments, such as time-of-flight (ToF) and quadrupole mass filters, also operate best when the ion flux at their detectors is within a certain range. Both trapping-type and beam-type devices may be used with intermediate ion storage traps that accumulate ions to buffer down-stream processes such as mass analysis, thereby increasing scan speed and instrument sensitivity. These ion storage traps also have limited capacities, where over-filling can lead to deleterious effects, such as mass discrimination and loss of linearity, as the amount of signal detected is no longer linear with ion accumulation time.

Automated gain control (AGC) may be performed to regulate ion population in trapping-type and beam-type devices. In the case of filling a trapping device with a target number of ions, conventional AGC may be performed by using a gate apparatus that either transmits or blocks ions. Using estimates of the ion flux, the gate is opened for a given amount of time to accumulate a target number of ions in the device, after which the gate is closed until the accumulated ions are transferred out of the device. Alternatively, and especially in the case of beam-type devices, attenuation devices or partial gates may be used to regulate the ion flux to a level that does not saturate an analyzer or detector.

In conventional AGC methods, the accumulation time to be used for acquisition of a mass spectrum is estimated based on the ion flux of a prior (most recent) acquisition. However, conventional AGC methods assume that the ion flux will remain constant for the next acquisition, and thus the conventional AGC methods fail to account for the rapidly changing nature of the ion flux (e.g., ion intensity) during LC-MS or GC-MS analyses. As a result, the conventional AGC methods may overshoot the target number of ions while the ion flux is increasing and undershoot the target number of ions while the ion flux is decreasing, both of which may degrade analytical performance. The shortcomings of conventional AGC techniques are exacerbated when the ion flux has a non-Gaussian profile in which the ion flux quickly increases from a baseline level to a peak maximum and then gradually decreases from the peak maximum back to the baseline level. In these situations, the number of ions accumulated while the ion flux is increasing may be much larger than when the ion flux has a Gaussian profile.

One method of addressing these problems uses a conventional AGC scheme while decreasing the time between analytical scans. This brute force approach offers some improvement in ion population regulation accuracy but comes at the cost of efficiency. For example, when the AGC scheme uses dedicated prescans to estimate ion flux, the time used for prescans cannot be used to acquire analytical scans. When the AGC scheme uses a prior analytical scan for ion flux estimation, the analytical scan must be repeated more often, thereby reducing the instrument capacity. Moreover, increasing the sampling rate is not entirely effective except at the limit of small numbers of analytes being assayed.

For at least these reasons, there is a need for improved methods and systems for regulating ion population in mass spectrometry.

SUMMARY

The following description presents a simplified summary of one or more aspects of the methods and systems described herein in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects of the methods and systems described herein in a simplified form as a prelude to the more detailed description that is presented below.

In some illustrative embodiments, a method of performing mass spectrometry comprises: accumulating, over an accumulation time, ions produced from components eluting from a chromatography column; transferring the accumulated ions to a mass analyzer; acquiring, during an acquisition, a mass spectrum of detected ions derived from the transferred ions; obtaining, from a series of acquired mass spectra including the acquired mass spectrum and a plurality of previously-acquired mass spectra, an elution profile comprising a plurality of detection points representing intensity of the detected ions as a function of time; classifying, based on a subset of detection points included in the plurality of detection points, a current signal state of the elution profile; and setting, for a next acquisition of a mass spectrum, the accumulation time based on the classified current signal state of the elution profile.

In some illustrative embodiments, the acquiring the mass spectrum comprises performing a prescan.

In some illustrative embodiments, the acquiring the mass spectrum comprises performing tandem mass spectrometry; and the detected ions comprise product ions.

In some illustrative embodiments, the elution profile is based on a total ion current of each mass spectrum included in the series of mass spectra.

In some illustrative embodiments, the classifying the current signal state of the elution profile comprises selecting a particular signal state from among a plurality of signal states.

In some illustrative embodiments, each signal state indicates how the intensity of the detected ions is currently changing over time.

In some illustrative embodiments, the plurality of signal states comprises a baseline state, a rising state, an apex state, and a falling state.

In some illustrative embodiments, setting the accumulation time based on the classified current signal state of the elution profile comprises: determining a nominal accumulation time; identifying a correction factor associated with the classified current signal state of the elution profile; and correcting the nominal accumulation time based on the correction factor associated with the classified current signal state of the elution profile.

In some illustrative embodiments, the nominal accumulation time is determined based on a target population of ions divided by a current ion flux.

In some illustrative embodiments, the correction factor is configured to optimize a reward given by a reward policy.

In some illustrative embodiments, the correction factor is determined based at least in part on data obtained from the series of acquired mass spectra.

In some illustrative embodiments, the current signal state of the elution profile is classified based on a relative position of a selected detection point included in the plurality of detection points, the relative position of the selected detection point representing a position of the selected detection point relative to an expected reference point in the elution profile.

In some illustrative embodiments, the selected detection point is a most-recent detection point.

In some illustrative embodiments, the relative position of the selected detection point comprises a normalized intensity value of the selected detection point, the normalized intensity value representing a ratio of the detected intensity value of the selected detection point to an expected maximum intensity value of the elution profile.

In some illustrative embodiments, the relative position of the selected detection point comprises a temporal distance of the selected detection point to an expected time point in the elution profile.

In some illustrative embodiments, the classifying the current signal state of the elution profile comprises applying the subset of detection points to a trained machine learning model configured to estimate the relative position of the selected detection point based on the subset of detection points.

In some illustrative embodiments, the machine learning model is trained based at least in part on the plurality of detection points of the elution profile.

In some illustrative embodiments, an apparatus for performing mass spectrometry, comprises: an ion accumulator configured to accumulate, over an accumulation time, ions produced from components eluting from a chromatography column; a mass analyzer configured to acquire, during an acquisition, a series of mass spectra of detected ions derived from the accumulated ions after the accumulated ions are transferred from the ion accumulator; and a computing device configured to: obtain, from the series of mass spectra including the acquired mass spectrum and a plurality of previously-acquired mass spectra, an elution profile comprising a plurality of detection points representing intensity of the detected ions as a function of time; classify, based on a subset of detection points included in the plurality of detection points, a current signal state of the elution profile; and set, for a next acquisition of a mass spectrum, the accumulation time based on the classified current signal state of the elution profile.

In some illustrative embodiments, a method comprises: obtaining, from a series of mass spectra including a most recent mass spectrum and a plurality of previously-acquired mass spectra, an elution profile comprising a plurality of detection points each representing intensity of ions accumulated over an accumulation time and detected by a detector as a function of time; classifying, based on a subset of detection points included in the plurality of detection points, a current signal state of the elution profile; and setting, for a next acquisition of a mass spectrum, the accumulation time based on the classified current signal state of the elution profile.

In some illustrative embodiments, a method of performing mass spectrometry comprises: acquiring a mass spectrum of ions accumulated over an accumulation time; and setting, for a next acquisition of a mass spectrum, the accumulation time based on a series of mass spectra including the mass spectrum and a plurality of previously-acquired mass spectra.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Methods and systems for performing ion population regulation in mass spectrometry are described herein. In some illustrative embodiments, a method of performing ion population regulation includes accumulating, over an accumulation time, ions produced from components eluting from a chromatography column and transferring the accumulated ions to a mass analyzer. During an acquisition, a mass spectrum of ions derived from the transferred ions and detected by a detector is acquired. An elution profile comprising a plurality of detection points representing intensity of the detected ions as a function of time is obtained from a series of acquired mass spectra including the acquired mass spectrum and a plurality of previously-acquired mass spectra. Based on a subset of detection points included in the plurality of detection points, a current signal state of the elution profile is classified, and the accumulation time is set, based on the classified current signal state of the elution profile, for a next acquisition of a mass spectrum.

Various embodiments will now be described in more detail with reference to the figures. The systems and methods described herein may provide one or more of the benefits mentioned above and/or various additional and/or alternative benefits that will be made apparent herein.

In some implementations, the methods and systems for performing ion population regulation may be used in conjunction with a combined separation-mass spectrometry system, such as an LC-MS system. As such, an LC-MS system will now be described. The described LC-MS system is illustrative and not limiting. The methods and systems described herein may operate as part of or in conjunction with the LC-MS system described herein and/or with any other suitable separation-mass spectrometry system, including a high-performance liquid chromatography-mass spectrometry (HPLC-MS) system, a gas chromatography-mass spectrometry (GC-MS) system, or a capillary electrophoresis-mass spectrometry (CE-MS) system. The methods and systems described herein may also operate in conjunction with any other continuous flow sample source, such as a flow-injection MS system (FI-MS) in which analytes are injected into a mobile phase (without separation in a column) and enter the mass spectrometer with time-dependent variations in intensity (e.g., Gaussian-like peaks).

Figure 1:
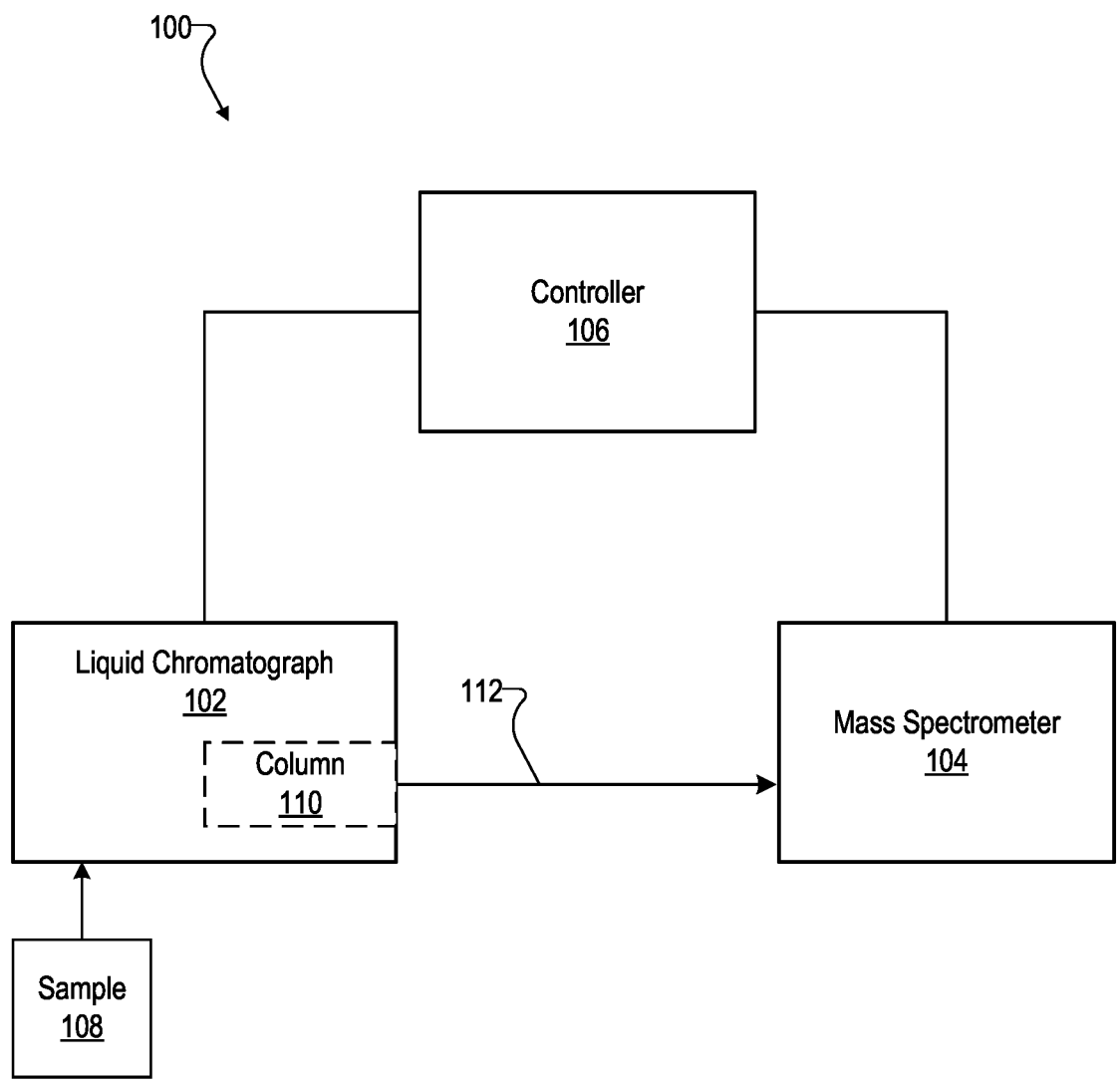
FIG. 1 shows an illustrative LC-MS system including a liquid chromatograph and a mass spectrometer.

FIG. 1 shows an illustrative LC-MS system 100. LC-MS system 100 includes a liquid chromatograph 102, a mass spectrometer 104, and a controller 106. Liquid chromatograph 102 is configured to separate, over time, components (e.g., analytes) within a sample 108 that is injected into liquid chromatograph 102. Sample 108 may include, for example, chemical components (e.g., molecules, ions, etc.) and/or biological components (e.g., metabolites, proteins, lipids, etc.) for detection and analysis by LC-MS system 100. Liquid chromatograph 102 may be implemented by any liquid chromatograph as may suit a particular implementation. In liquid chromatograph 102, sample 108 may be injected into a mobile phase (e.g., a solvent), which carries sample 108 through a column 110 containing a stationary phase (e.g., an adsorbent packing material). As the mobile phase passes through column 110, components within sample 108 elute from column 110 at different times based on, for example, their size, their affinity to the stationary phase, their polarity, and/or their hydrophobicity.

A detector (e.g., an ion detector component of mass spectrometer 104, an ion-electron converter and electron multiplier, etc.) may measure the relative intensity of a signal modulated by each separated component in eluate 112 from column 110. Data generated by the detector may be represented as a chromatogram, which plots retention time on the x-axis and a signal representative of the relative intensity on the y-axis. The retention time of a component is generally measured as the period of time between injection of sample 108 into the mobile phase and the relative intensity peak maximum after chromatographic separation. In some examples, the relative intensity may be correlated to or representative of relative abundance of the separated components. Data generated by liquid chromatograph 102 may be output to controller 106.

In some cases, particularly in analyses of complex mixtures, multiple different components in sample 108 may co-elute from column 110 at approximately the same time, and thus may have the same or similar retention times. As a result, determination of the relative intensity of the individual components within sample 108 requires further separation of signals attributable to the individual components. To this end, liquid chromatograph 102 directs components included in eluate 112 to mass spectrometer 104 for identification and/or quantification of one or more of the components.

Mass spectrometer 104 is configured to produce ions from the components received from liquid chromatograph 102 and sort or separate the produced ions based on m/z of the ions. A detector in mass spectrometer 104 measures the intensity of the signal produced by the ions. As used herein, "intensity" or "signal intensity" may refer to any suitable metric, such as abundance, relative abundance, ion count, intensity, or relative intensity. Data generated by the detector may be represented by mass spectra, which plot the intensity of the observed signal as a function of m/z of the detected ions. Data acquired by mass spectrometer 104 may be output to controller 106.

Figure 2A:
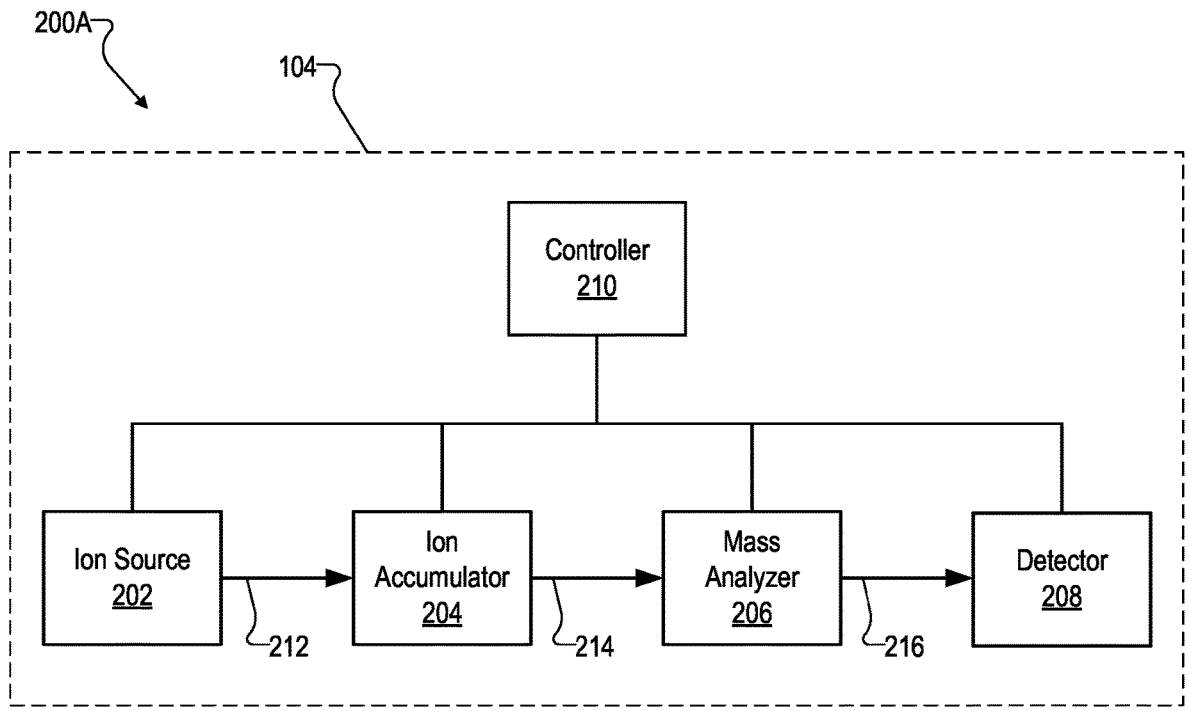
FIG. 2A shows an illustrative implementation of the mass spectrometer of FIG. 1 including an ion accumulator.

Mass spectrometer 104 may be implemented by any suitable mass spectrometer. FIG. 2A shows a functional diagram of an illustrative implementation 200A of mass spectrometer 104. As shown, mass spectrometer 104 includes an ion source 202, an ion accumulator 204, a mass analyzer 206, a detector 208, and a controller 210. Mass spectrometer 104 may further include any additional or alternative components not shown as may suit a particular implementation (e.g., ion optics, filters, ion storage devices, ion mobility analyzers, etc.).

Ion source 202 is configured to produce a stream of ions 212 from the components eluting from liquid chromatograph 102 and deliver ion stream 212 to ion accumulator 204. Ion source 202 may use any suitable ionization technique, including without limitation electron ionization, chemical ionization, matrix assisted laser desorption/ionization, electrospray ionization, atmospheric pressure chemical ionization, atmospheric pressure photoionization, inductively coupled plasma, and the like. Ion source 202 may include various components for producing ions from components included in sample 108 and delivering the ions to ion accumulator 204.

Ion accumulator 204 is a device configured to accumulate, over an accumulation time, ions included in ion stream 212. In some examples, ion accumulator 204 is an ion storage device configured to buffer down-stream processes, such as mass analysis, thereby increasing scan speed and instrument sensitivity. In some examples, ion accumulator 204 is a trapping device, such as a linear quadrupole ion trap, a three-dimensional quadrupole ion trap, a cylindrical ion trap, a toroidal ion trap, an orbital electrostatic trap, a Kingdon trap, and the like. The accumulation of ions in ion accumulator 204 may be regulated with the aim to achieve a target number of ions in ion accumulator 204. Regulation of the accumulation of ions in ion accumulator 204 may be performed by a gate apparatus (not shown) that either transmits or blocks ion stream 212. Using estimates of the ion flux of ion stream 212 (e.g., quantity of ions (as measured by intensity) per unit time), as will be described below in more detail, the gate may be opened for a given amount of time to meter the appropriate number of ions, after which the gate is closed. The accumulated ions may then be transferred as ion stream 214 from ion accumulator 204 to mass analyzer 206.

Mass analyzer 206 is configured to separate ions in ion stream 214 according to m/z of each of the ions to filter and/or perform a mass analysis of the ions and frequently provide an ion stream 216 to detector 208. Mass analyzer 206 may be implemented by any suitable beam-type or trapping-type mass analyzer, such as a quadrupole mass filter, an ion trap (e.g., a linear quadrupole ion trap, a three-dimensional quadrupole ion trap, a cylindrical ion trap, a toroidal ion trap, etc.), a time-of-flight (TOF) mass analyzer, an electrostatic trap mass analyzer (e.g. an orbital electrostatic trap such as an Orbitrap mass analyzer, a Kingdon trap, etc.), a Fourier transform ion cyclotron resonance (FT-ICR) mass analyzer, a sector mass analyzer, and the like.

In some examples, mass spectrometer 104 is a tandem mass spectrometer (tandem-in-time or tandem-in-space) configured to perform tandem mass spectrometry (e.g., MS/MS), a multi-stage mass spectrometer configured to perform multi-stage mass spectrometry (also denoted MS"), or a hybrid mass spectrometer. For example, mass analyzer 206 may include multiple mass analyzers, mass filters, and/or collision cells. The term "collision cell," as used herein, may include any structure arranged to produce product ions via controlled dissociation processes or ion-ion reaction processes and is not limited to devices employed for collisionally-activated dissociation. For example, a collision cell may be configured to fragment the ions using collision induced dissociation (CID), electron transfer dissociation (ETD), electron capture dissociation (ECD), photo induced dissociation (PID), surface induced dissociation (SID), and the like. A collision cell may be positioned upstream from a mass filter, which separates the fragmented ions based on the ratio of mass to charge of the ions. In some embodiments, mass analyzer 206 may include a combination of multiple mass filters and/or collision cells, such as a triple quadrupole mass analyzer, where a collision cell is interposed in the ion path between independently operable mass filters.

While FIG. 2A shows that ion accumulator 204 is positioned upstream from mass analyzer 206, ion accumulator 204 may be positioned at any other location along an ion path from ion source 202 to detector 208 within a tandem mass spectrometer or multi-stage mass spectrometer (e.g., between a first mass filter (Q1) and a collision cell (Q2) and/or between a collision cell (Q2) and a second mass filter (Q3)). Additionally, mass spectrometer 104 may include more than one ion accumulator 204, such as when mass spectrometer 104 is a tandem mass spectrometer or multi-stage mass spectrometer.

Ion detector 208 is configured to detect ions either within the mass analyzer 206 or in ion stream 216 from the mass analyzer 206 at each of a variety of different m/z and responsively generate an electrical signal representative of ion intensity. The electrical signal is transmitted to controller 210 for processing, such as to construct a mass spectrum of the detected ions. For example, mass analyzer 206 may emit an emission beam of separated ions to detector 208, which is configured to detect the ions in the emission beam and generate or provide data that can be used by controller 210 to construct a mass spectrum. Ion detector 208 may be implemented by any suitable detection device, including without limitation an electron multiplier, a Faraday cup, and the like.

Controller 210 may be communicatively coupled with, and configured to control various operations of, mass spectrometer 104. For example, controller 210 may be configured to control operation of various hardware components included in ion source 202, ion accumulator 204, mass analyzer 206, and/or detector 208. To illustrate, controller 210 may be configured to control an accumulation time of ion accumulator 204 and/or mass analyzer 206, control an oscillatory voltage power supply and/or a DC power supply to supply an RF voltage and/or a DC voltage to mass analyzer 206, adjust values of the RF voltage and DC voltage to select an effective m/z (including a mass tolerance window) for analysis, and adjust the sensitivity of ion detector 208 (e.g., by adjusting the detector gain).

Controller 210 may also include and/or provide a user interface configured to enable interaction between a user of mass spectrometer 104 and controller 210. The user may interact with controller 210 via the user interface by tactile, visual, auditory, and/or other sensory type communication. For example, the user interface may include a display device (e.g., liquid crystal display (LCD) display screen, a touch screen, etc.) for displaying information (e.g., mass spectra, notifications, etc.) to the user. The user interface may also include an input device (e.g., a keyboard, a mouse, a touchscreen device, etc.) that allows the user to provide input to controller 210. In other examples the display device and/or input device may be separate from, but communicatively coupled to, controller 210. For instance, the display device and the input device may be included in a computer (e.g., a desktop computer, a laptop computer, a mobile device, etc.) communicatively connected to controller 210 by way of a wired connection (e.g., by one or more cables) and/or a wireless connection (e.g., Wi-Fi, Bluetooth, near-field communication, etc.).

Controller 210 may include any suitable hardware (e.g., a processor, circuitry, etc.) and/or software as may serve a particular implementation. While FIG. 2A shows that controller 210 is included in mass spectrometer 104, controller 210 may alternatively be implemented in whole or in part separately from mass spectrometer 104, such as by a computing device communicatively coupled to mass spectrometer 104 by way of a wired connection (e.g., a cable) and/or a network (e.g., a local area network, a wireless network (e.g., Wi-Fi), a wide area network, the Internet, a cellular data network, etc.). In some examples, controller 210 may be implemented in whole or in part by controller 106 (and vice versa).

Figure 2B:
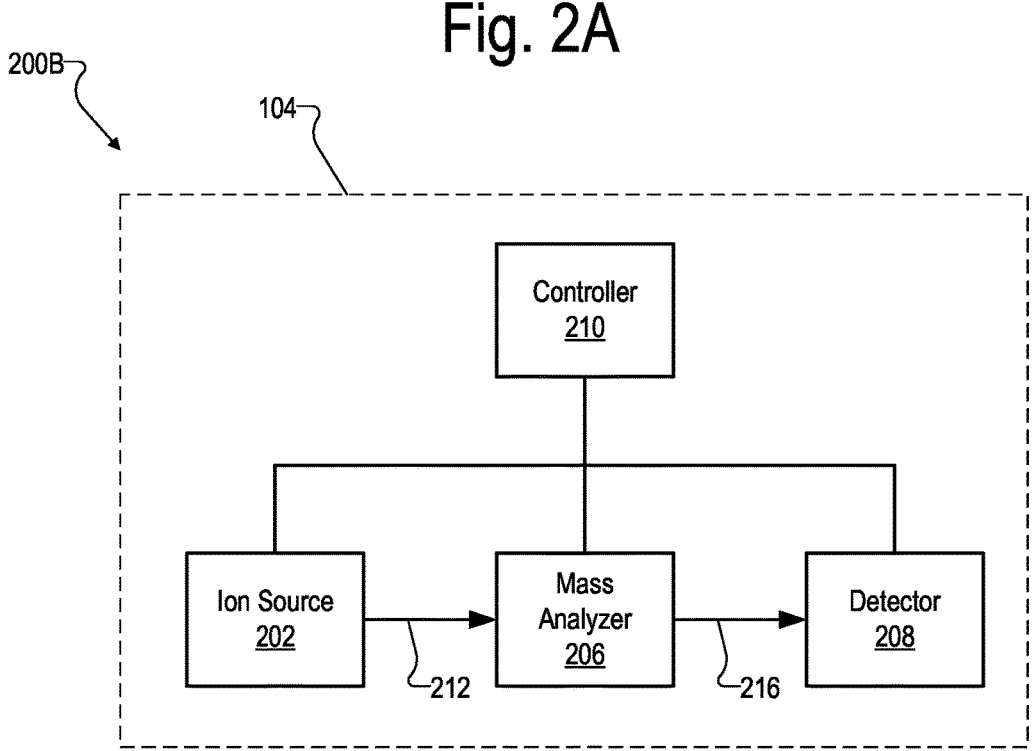
FIG. 2B shows another illustrative implementation of the mass spectrometer of FIG. 1 including a trapping-type mass analyzer.

FIG. 2B shows a functional diagram of another illustrative implementation 200B of mass spectrometer 104. Implementation 200B is similar to implementation 200A except that, in implementation 200B, mass analyzer 206 is a trapping-type mass analyzer and ion accumulator 204 and ion stream 214 from ion accumulator 204 are omitted. Ions are accumulated in mass analyzer 206 over an accumulation time to achieve a target number of ions in mass analyzer 206.

Referring again to FIG. 1, controller 106 may be communicatively coupled with, and configured to control operations of, LC-MS system 100 (e.g., liquid chromatograph 102 and/or mass spectrometer 104). Controller 106 may include any suitable hardware (e.g., a processor, circuitry, etc.) and/or software configured to control operations of and/or interface with the various components of LC-MS system 100 (e.g., liquid chromatograph 102 and/or mass spectrometer 104).

For example, controller 106 may be configured to acquire data acquired over time by liquid chromatograph 102 and mass spectrometer 104. The data may include a series of mass spectra including intensity values of ions produced from the components of sample 108 as a function of m/z of the ions. The data may be represented in a three-dimensional map in which time (e.g., retention time) is plotted along an x-axis, m/z is plotted along a y-axis, and intensity is plotted along a z-axis. Spectral features on the map (e.g., peaks of intensity) represent detection by LC-MS system 100 of ions produced from various components included in sample 108. The x-axis and z-axis of the map may be used to generate a mass chromatogram that plots intensity as a function of time for a selected m/z (e.g., an extracted ion chromatogram (XIC)) or for a full m/z spectrum (e.g., a total ion current (TIC)). As used herein, a "selected m/z" may include a specific m/z with or without a mass tolerance window or a narrow range of m/z. The y-axis and z-axis of the map may be used to generate mass spectra, each mass spectrum plotting intensity as a function of m/z for a particular acquisition (e.g., for each MS scan or MS/MS scan).

Figure 3:
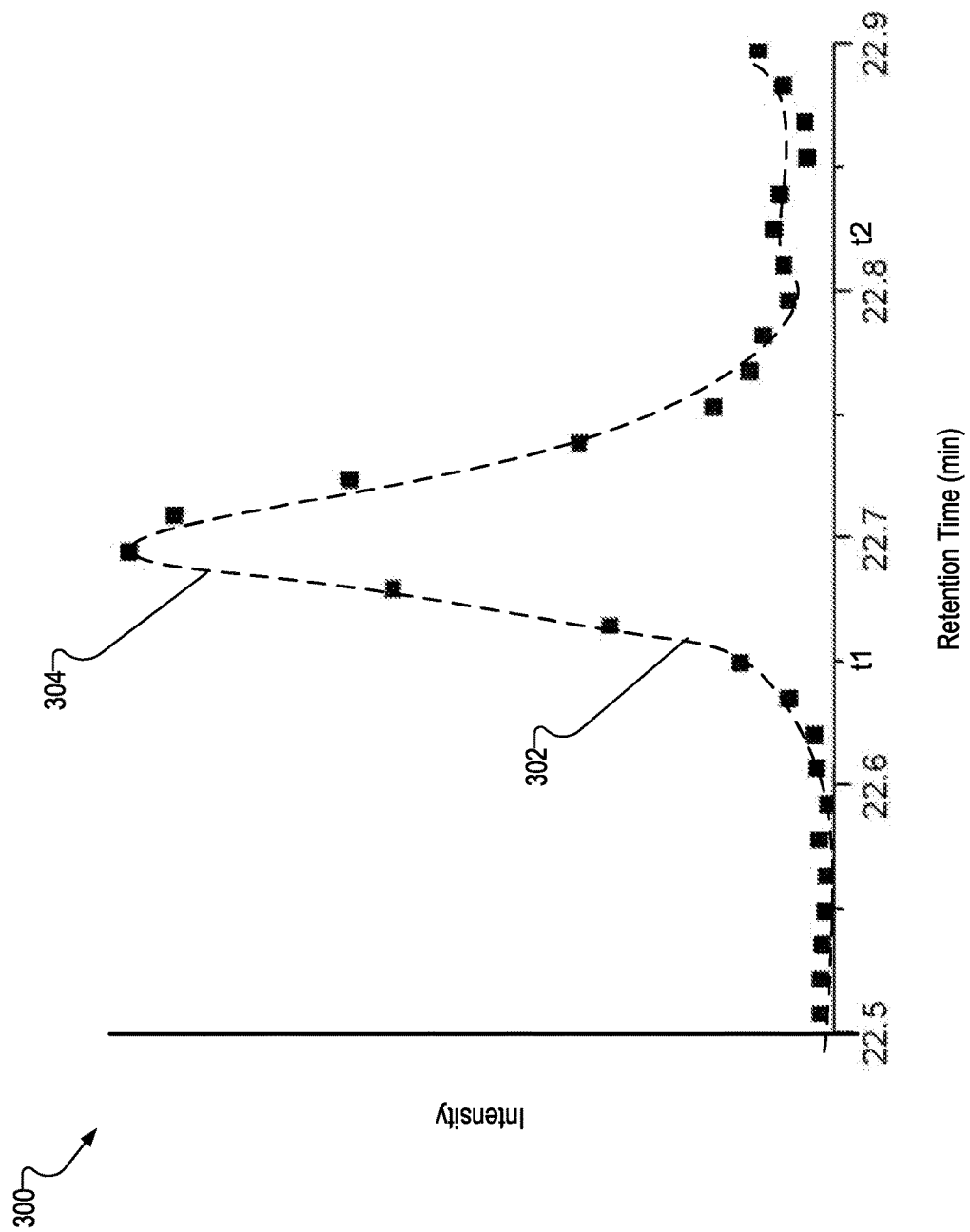
FIG. 3 shows an illustrative elution profile (e.g., a total ion current (TIC) chromatogram) of ions produced from components included in a sample as the components elute from the liquid chromatograph of FIG. 1.

FIG. 3 shows a portion of an illustrative mass chromatogram 300 (e.g., a TIC) of ions derived from components included in sample 108 and that elute from liquid chromatograph 102. Mass chromatogram 300 is generated from data acquired by mass spectrometer 104, such as a plurality of survey acquisitions (e.g., MS full-spectrum prescans) or analytical acquisitions (e.g., MS or MS/MS scans). Mass chromatogram 300 plots intensity (arbitrary units) as a function of retention time (in minutes). As shown, mass chromatogram 300 includes a plurality of detection points, each acquired from a different acquisition, that together form an elution profile 302 of the component (as indicated by the dashed line curve). As the components elute from column 110, the detected intensity of the ions produces a peak 304 having a roughly Gaussian profile. However, peak 304 and/or other peaks (not shown) in elution profile 302 may have other, non-Gaussian profiles.

Conventional AGC methods for regulating ion population in an ion storage device or mass analyzer assume that the ion flux (quantity (e.g., intensity) of ions per unit time) will remain constant for the next acquisition and thus set the accumulation time based on the ion flux of the prior acquisition. However, as shown in FIG. 3 the ion flux during an LC-MS experiment is not constant but is dynamic and, at times, fast-changing as the components elute from the column. Hence, the conventional AGC methods overshoot the accumulation time during which ions are accumulated (and, hence, overshoot the target number of ions) while the peak intensity is increasing and undershoot the accumulation time (and, hence, undershoot the target number of ions) while the peak intensity is decreasing.

An improved method of regulating ion population accounts for the dynamic and fast-changing nature of the ion flux by classifying a current signal state of the ion signal in the elution profile based on a set of historic detection points (e.g., a set of most recent detection points) and setting the accumulation time for the next acquisition based on the current signal state of the ion signal of the elution profile. For example, a nominal accumulation time $t_{nom}$ for a next acquisition may be determined as the target number of ions to be accumulated divided by the ion flux of the prior acquisition. The accumulation time $t_{accum}$ for the next acquisition may then be set by correcting the nominal accumulation time $t_{nom}$ with a correction factor that is associated with the current signal state of the ion signal in the elution profile. For instance, when the current signal state is a rising state (e.g., the ion intensity is increasing), the correction factor decreases the accumulation time $t_{accum}$ as compared with the nominal accumulation time $t_{nom}$ to prevent overshooting the target number of ions. When the current signal state is a falling state (e.g., the ion intensity is decreasing), the correction factor may increase the accumulation time $t_{accum}$ as compared with the nominal accumulation time $t_{nom}$ to prevent undershooting the target number of ions. These and other illustrative methods and systems for regulating ion population will be described in more detail below.

Figure 4:
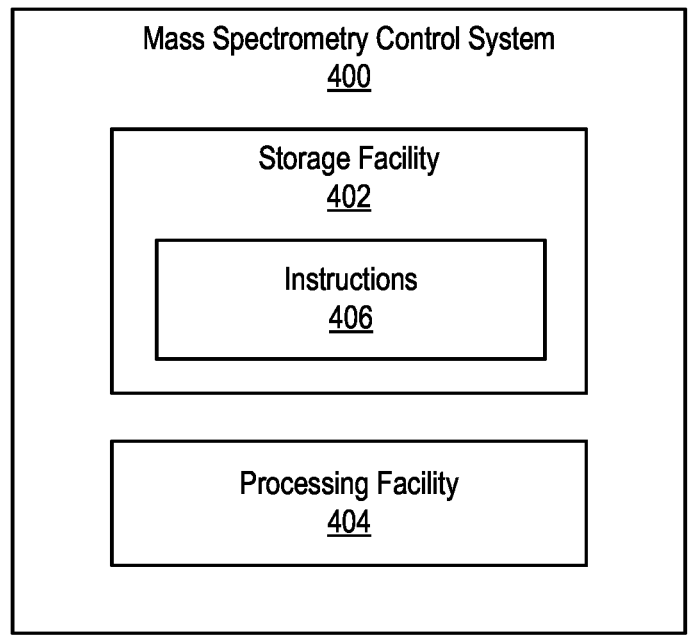
FIG. 4 shows an illustrative mass spectrometry control system configured to perform ion population regulation.

One or more operations associated with improved methods of ion population regulation may be performed by a mass spectrometry control system. FIG. 4 shows an illustrative mass spectrometry control system 400 ("system 400"). System 400 may be implemented entirely or in part by LC-MS system 100 (e.g., by controller 106 and/or controller 210). Alternatively, system 400 may be implemented separately from LC-MS system 100.

System 400 may include, without limitation, a storage facility 402 and a processing facility 404 selectively and communicatively coupled to one another. Facilities 402 and 404 may each include or be implemented by hardware and/or software components (e.g., processors, memories, communication interfaces, instructions stored in memory for execution by the processors, etc.). In some examples, facilities 402 and 404 may be distributed between multiple devices and/or multiple locations as may serve a particular implementation.

Storage facility 402 may maintain (e.g., store) executable data used by processing facility 404 to perform any of the operations described herein. For example, storage facility 402 may store instructions 406 that may be executed by processing facility 404 to perform any of the operations described herein. Instructions 406 may be implemented by any suitable application, software, code, and/or other executable data instance.

Storage facility 402 may also maintain any data acquired, received, generated, managed, used, and/or transmitted by processing facility 404. For example, storage facility 402 may maintain LC-MS data (e.g., acquired chromatogram data and/or mass spectra data) and/or classification data. Classification data may include data representative of, used by, or associated with one or more models (e.g., machine learning models) or algorithms maintained by processing facility 404 for classifying a current signal state of an ion signal in an elution profile.

Processing facility 404 may be configured to perform (e.g., execute instructions 406 stored in storage facility 402 to perform) various processing operations described herein. It will be recognized that the operations and examples described herein are merely illustrative of the many different types of operations that may be performed by processing facility 404. In the description herein, any references to operations performed by system 400 may be understood to be performed by processing facility 404 of system 400. Furthermore, in the description herein, any operations performed by system 400 may be understood to include system 400 directing or instructing another system or device to perform the operations.

Figure 5:
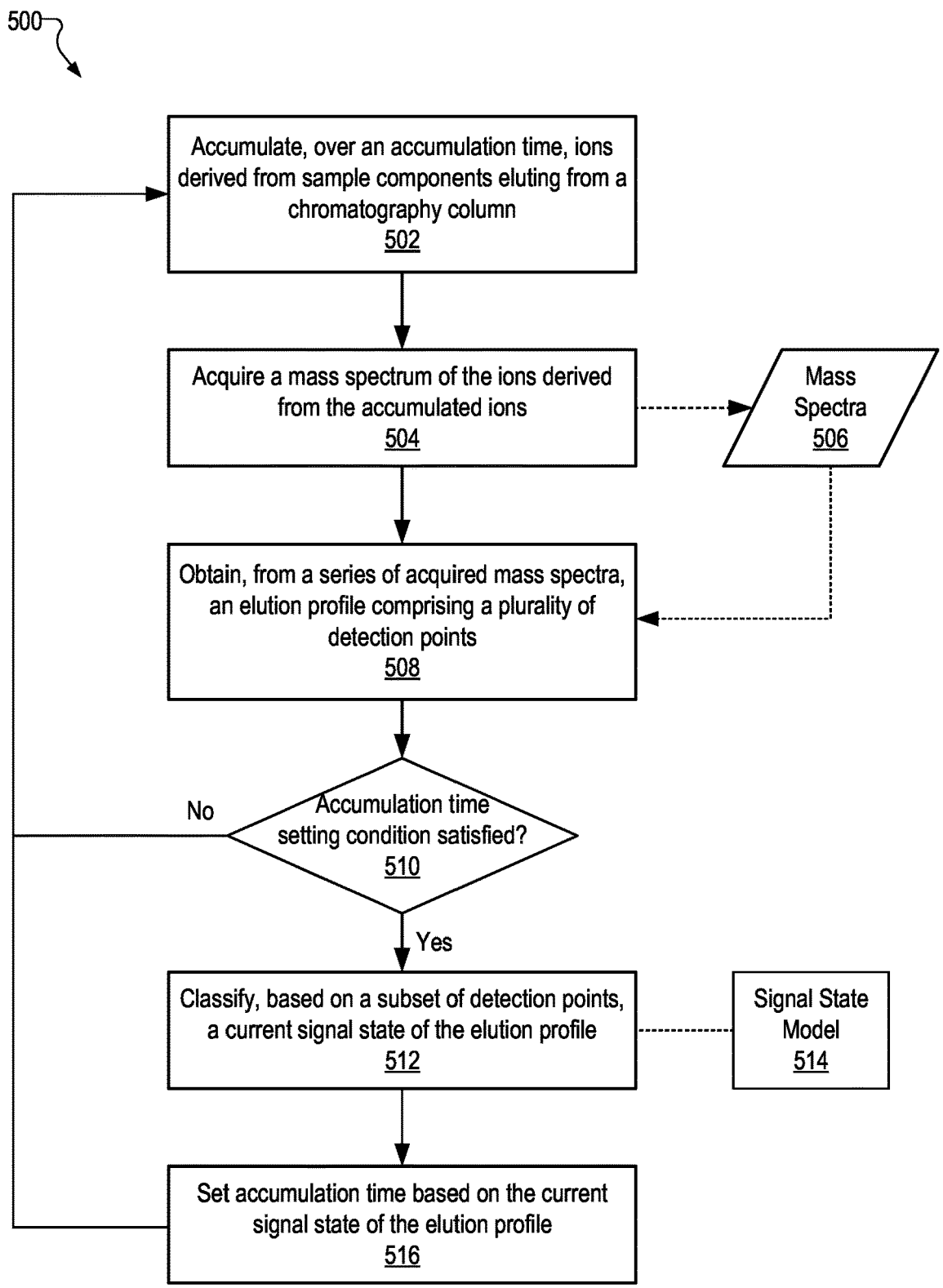
FIG. 5 shows an illustrative method of performing ion population regulation.

FIG. 5 shows an illustrative method of ion population regulation for mass spectrometry. While FIG. 5 shows illustrative operations according to one embodiment, other embodiments may omit, add to, reorder, and/or modify any of the operations shown in FIG. 5. One or more of the operations shown in FIG. 5 may be performed by LC-MS system 100 and/or system 400, any components included therein, and/or any implementations thereof.

In operation 502, ions produced from the sample components eluting from column 110 are accumulated over an accumulation time $t_{accum}$. The ions may be accumulated in any device, such as ion accumulator 204 or mass analyzer 206 (e.g., a trapping-type device). The accumulation time $t_{accum}$ may be initially set to a default or baseline accumulation time $t_{base}$ configured to produce a target population of accumulated ions. The target population of accumulated ions may be based, for example, on characteristics of ion accumulator 204, mass analyzer 206, and/or detector 208, such as storage space charge capacity and/or spectral space charge capacity.

In some examples, the initial value of accumulation time $t_{accum}$ may be set manually by a user (e.g., by way of controller 106 or controller 210). In further examples, the initial value of accumulation time $t_{accum}$ may be set automatically by system 400, such as based on a default value, based on method parameters for the particular method or assay, based on characteristics of ion accumulator 204, mass analyzer 206 or detector 208, and/or based on information provided by the user (e.g., based on a number of target analytes, etc.). The initial value of accumulation time $t_{accum}$ may be set so as to prevent overshooting and undershooting the target number of ions.

In operation 504, a mass spectrum of ions derived from the accumulated ions is acquired. Operation 504 may be acquired in any suitable way. For example, if the ions are accumulated in ion accumulator 204, the accumulated ions are transferred to mass analyzer 206, which performs a mass analysis of the accumulated ions, such as a full-spectrum MS scan, or an MS/MS prescan or analytical scan in which the detected ions are product ions. If the ions are accumulated in a trapping-type mass analyzer, the mass analyzer performs a mass analysis of the accumulated ions. The mass spectrum is then stored (e.g., in storage facility 402) with a series of mass spectra 506 previously acquired and stored during the experiment. If the mass spectrum is the first mass spectrum acquired during the experiment, the mass spectrum is stored, and subsequently-acquired mass spectra may be combined with the mass spectrum to produce series of mass spectra 506.

In operation 508, system 400 obtains, from mass spectra 506, an elution profile comprising a plurality of detection points each from a different acquisition and representing intensity of the ions, as detected by mass spectrometer 104, as a function of time. As mentioned, the intensity value of each detection point may represent the total ion current for the corresponding mass spectrum included in mass spectra 506 as a function of time.

In operation 510, system 400 determines whether an accumulation time setting condition is satisfied. The accumulation time setting condition ensures that there is sufficient data for system 400 to set the accumulation time based on a subset of detection points included in the elution profile. In some examples, the accumulation time setting condition comprises a determination that a minimum or predetermined number of detection points have been acquired (e.g., 6, 24, 48, 100, etc.).

In alternative examples, the accumulation time setting condition comprises a determination that a minimum amount of time has elapsed since a reference time. The reference time may be, for example, a time of a first acquisition, a time at which sample 108 was injected to liquid chromatograph 102, or a time when instrument conditions or method parameters changed. In some examples, system 400 may determine whether the time elapsed since the reference time is greater than or equal to a sliding time window size. The sliding time window may encompass, for example, a period of 0.1 seconds, 0.5 seconds, 3 seconds, etc.

If the accumulation time setting condition is not satisfied, the processing of method 500 returns to operation 502 for another acquisition. If, however, the accumulation time setting condition is satisfied, the processing of method 500 proceeds to operation 512.

In operation 512, system 400 classifies, based on a subset of detection points included in the plurality of detection points of the elution profile and based on a signal state model 514, a current signal state of the ion signal of the elution profile. The signal state indicates how the intensity signal is currently changing over time at a detection point selected by system 400 (e.g., a most recent detection point). For example, the signal state may be a baseline state that indicates little to no change in detected intensity, a rising state that indicates that the detected intensity is increasing toward an estimated or predicted apex of a peak in the elution profile, an apex state in which the detected intensity is near the peak apex, or a falling state that indicates that the detected intensity is decreasing from the peak apex toward a baseline value. In some examples, the current signal state of the ion signal may be classified by selecting a particular signal state from among a plurality of signal states (e.g., a baseline state, a rising state, an apex state, and a falling state) based on the estimated position of the selected detection point (e.g., a most recent detection point) relative to an expected reference point (e.g., an estimated or predicted peak apex). Illustrative embodiments of operation 512 will be described in more detail below.

In operation 516, system 400 sets the accumulation time $t_{accum}$ based on the current signal state classified in operation 512. For example, system 400 may determine a nominal accumulation time $t_{nom}$ based on the ion flux of the selected detection point (e.g., the most recent detection point) and then correct the nominal accumulation time $t_{nom}$ with a correction factor associated with the current signal state to obtain the accumulation time $t_{accum}$. Illustrative embodiments of operation 516 will be described in more detail below.

After operation 516, the processing of method 500 returns to operation 502 for another acquisition with the accumulation time $t_{accum}$ previously set in operation 516. Method 500 may continue until it is automatically or manually terminated.

Illustrative embodiments of performing operation 512 will now be described with reference to FIG. 6, which shows an illustrative TIC 600 that may be generated from, or is representative of, series of mass spectra 506, and FIG. 7, which shows TIC 600 after data from two additional acquisitions have been added to TIC 600. TIC 600 will facilitate description of operation 512, but operation 512 may be performed with raw source data without generating TIC 600.

TIC 600 plots a plurality of detection points 602 each representing a detected intensity value (arbitrary units), as detected by mass spectrometer 104 during a prescan or analytical acquisition, as a function of retention time (in minutes). Each successive mass spectrum acquisition by mass spectrometer 104 adds a new detection point 602 to TIC 600. As shown on TIC 600, the right-most detection point 602-1 is a current (most-recent) detection point 602 acquired at current time $t_c$ and having a current intensity value $I_c$, as indicated by dashed line 604. As shown in FIG. 6, detection points 602 together form an elution profile of the components eluting from column 110. The upward trajectory of intensity values of detection points 602 indicates the start of a peak 606 in the expected (e.g., estimated or predicted) elution profile. In FIG. 6, the expected elution profile is represented by a dashed-line curve.

Figure 6:
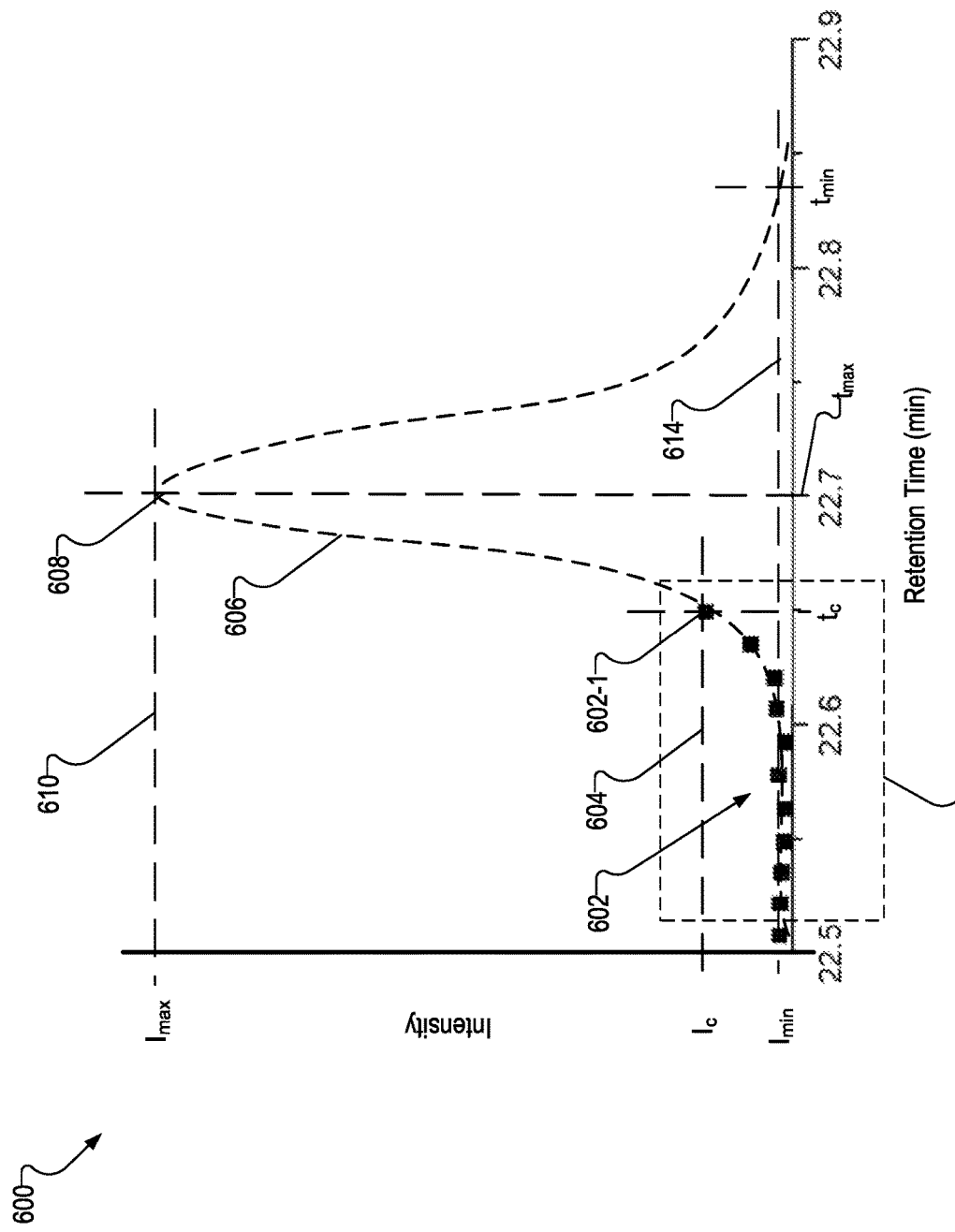
FIG. 6 shows an illustrative TIC comprising an elution profile that may be generated from, or is representative of, a series of mass spectra acquired by the LC-MS system of FIG. 1 and that includes a plurality of detection points.
Figure 7:
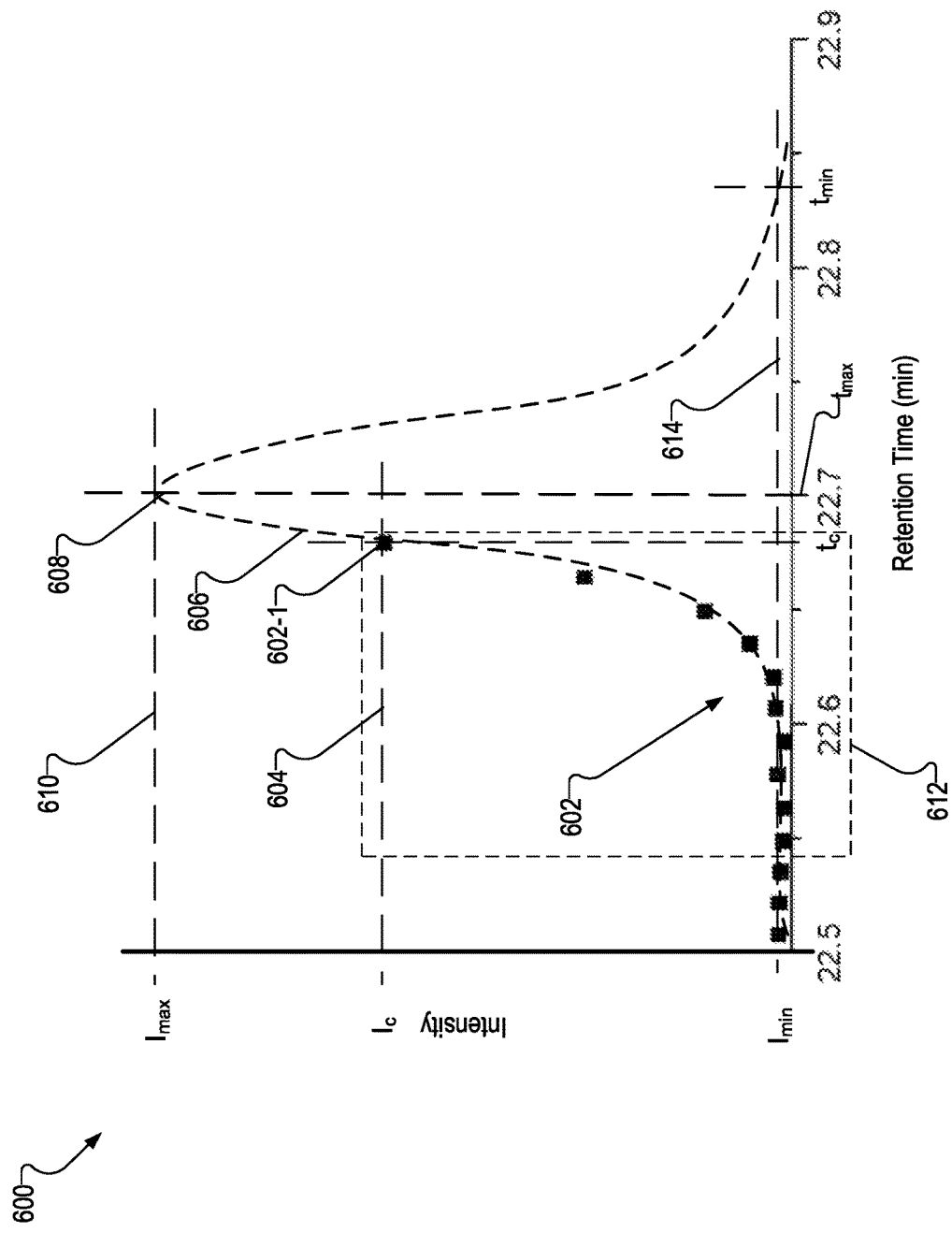
FIG. 7 shows the illustrative TIC of FIG. 6 after two additional detection points have been acquired.
Figure 8:
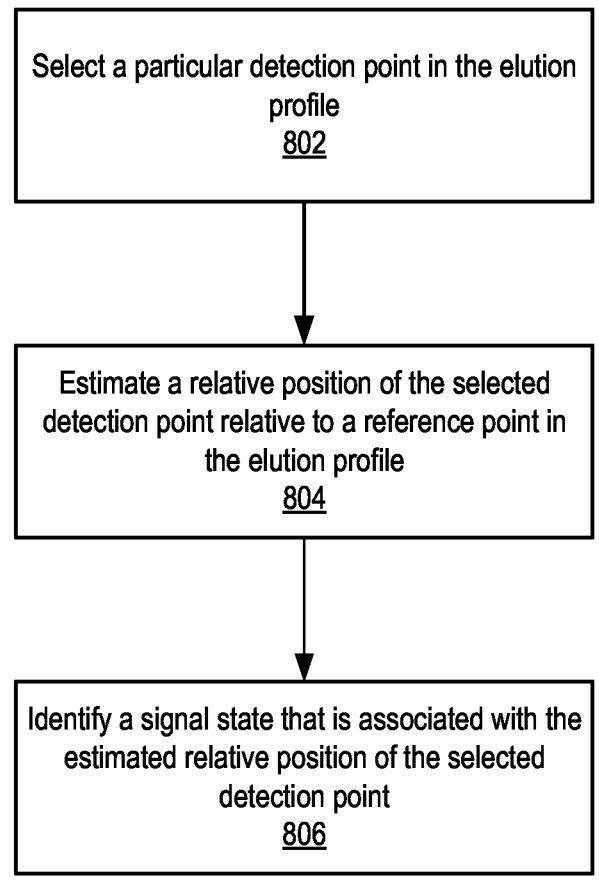
FIG. 8 shows an illustrative method of estimating a relative position of a selected detection point relative to a reference point in the elution profile.

FIG. 8 shows an illustrative method 800 of classifying the current signal state of the ion signal of the elution profile of FIG. 6 or FIG. 7 (e.g., operation 512). While FIG. 8 shows illustrative operations according to one embodiment, other embodiments may omit, add to, reorder, and/or modify any of the operations shown in FIG. 8. One or more of the operations shown in FIG. 8 may be performed by LC-MS system 100 and/or system 400, any components included therein, and/or any implementations thereof.

In operation 802, system 400 selects a particular detection point 602 in the elution profile. In the example described herein, the selected detection point 602 is the current detection point 602-1. In alternative examples, the selected detection point may be any historical detection point 602 acquired during the procedure (e.g., any detection point 602 acquired prior to current time $t_c$, such as a second or third most-recent detection point 602), or the selected detection point may be a combination (e.g., an average) of multiple historical detection points.

In operation 804, system 400 estimates a relative position of selected detection point 602-1 relative to a reference point in the elution profile. Estimation of the relative position of selected detection point 602-1 is based on the principle that the relative position of selected detection point 602-1 is a function of detected intensity values of a plurality of detection points 602 around (e.g., preceding and/or following) selected detection point 602-1. Thus, the position of selected detection point 602-1 relative to the reference point (e.g., the expected or predicted apex 608) of peak 606 may be estimated in real-time and used to identify the current signal state of the ion signal in the elution profile.

In some examples, the relative position of selected detection point 602-1 relative to a reference point is a normalized intensity value of selected detection point 602-1 relative to a reference intensity value. As shown in FIGS. 6 and 7, the reference intensity value may be, for example, an expected maximum intensity value $I_{max}$ at an apex 608 of peak 606, as indicated by dashed line 610. However, since the maximum intensity value $I_{max}$ of peak 606 has not yet been detected at current time $t_c$, intensity values for a distinct set 612 of a plurality of detection points 602 are applied as inputs to signal state model 514, which is configured to estimate the normalized intensity value of the selected detection point 602-1.

In some examples, set 612 comprises a predetermined number (e.g., 6, 24, 48, 100, etc.) of detection points 602. In alternative examples, set 612 comprises only the detection points 602 that occur within a sliding time window. For example, the sliding time window may encompass a period of 0.1 seconds, 0.5 seconds, 3 seconds, etc. In either configuration, the selected detection point 602 is included in the set 612. If detection points 602 are not evenly spaced along the time axis, detection points 602 may be corrected (such as by interpolation) to a fixed and uniform time spacing (e.g., 1 second) to simplify processing.

Signal state model 514 is configured to use set 612 as an input to perform any suitable heuristic, process, and/or operation that may be performed or executed by system 400 to estimate a normalized intensity value of the selected detection point 602-1. In some examples, signal state model 514 may be implemented by hardware and/or software components (e.g., processors, memories, communication interfaces, instructions stored in memory for execution by the processors, etc.), such as storage facility 402 and/or processing facility 404 of system 400. Signal state model 514 may include any suitable algorithm and/or machine learning model configured to estimate a normalized intensity value of a selected detection point based on intensity values for a set of historical detection points (e.g., set 612). Signal state model 514 may estimate the normalized intensity value in any suitable way. In some examples, signal state model 514 comprises a machine learning model. An illustrative machine learning model, and methods of training the machine learning model, will be described below in more detail.

When the reference intensity value is the expected maximum intensity value $I_{max}$ at apex 608 of peak 606, the normalized intensity value of selected detection point 602-1 will generally range from 0 to 1. In the example of FIG. 6, system 400 estimates the current normalized intensity value of selected detection point 602-1 to be about 0.15, thus indicating that the current normalized intensity value $I_c$ of selected detection point 602-1 is about 15% of the expected intensity value $I_{max}$ at apex 608. In the example of FIG. 7, system 400 estimates the current normalized intensity value $I_c$ of the current detection point 602-1 to be about 0.65.

In the examples described above, the reference intensity value is the expected maximum intensity value $I_{max}$ at apex 608 of peak 606. However, any other normalization scheme may be used, and the reference intensity value may be any other suitable reference value, such as a known running average intensity value, a global maximum intensity value for multiple different m/z, or a recent maximum intensity value.

In the examples just described, the relative position of selected detection point 602-1 is the normalized intensity value of selected detection point 602-1 relative to a reference intensity value. In other examples, the relative position of selected detection point 602-1 is a temporal distance of selected detection point 602-1 relative to a temporal reference point. For example, as shown in FIGS. 6 and 7, the temporal reference point may occur at an expected time $t_{max}$ at which the intensity value of peak 606 is expected to reach maximum intensity value $I_{max}$ at apex 608. System 400 may estimate the temporal distance (e.g., a difference between $t_{max}$ and $t_c$) of selected detection point 602-1 to the reference point in any suitable way.

In some examples, the temporal distance is estimated in a manner similar to estimating the normalized intensity value of selected detection point 602-1. For example, set 612 of detection points 602 and/or the estimated normalized intensity values are applied as inputs to signal state model 514, which is additionally or alternatively configured to estimate expected time $t_{max}$ based on a set of historical detection points. As shown in FIG. 6, system 400 may estimate, based on set 612, a temporal distance of selected detection point 602-1 to be 0.05 minutes (e.g., 3 seconds). As shown in FIG. 7, system 400 may estimate, based on set 612, the temporal distance of selected detection point 602-1 to be 0.02 minutes (e.g., 1.2 seconds).

Referring again to FIG. 8, in operation 806 system 400 identifies a signal state that is associated with the estimated relative position of selected detection point 602-1. Operation 806 may be performed in any suitable way. In some examples, system 400 may select, based on the relative position of selected detection point 602-1 estimated in operation 804, a particular signal state from among a plurality of signal states.

Figure 9:
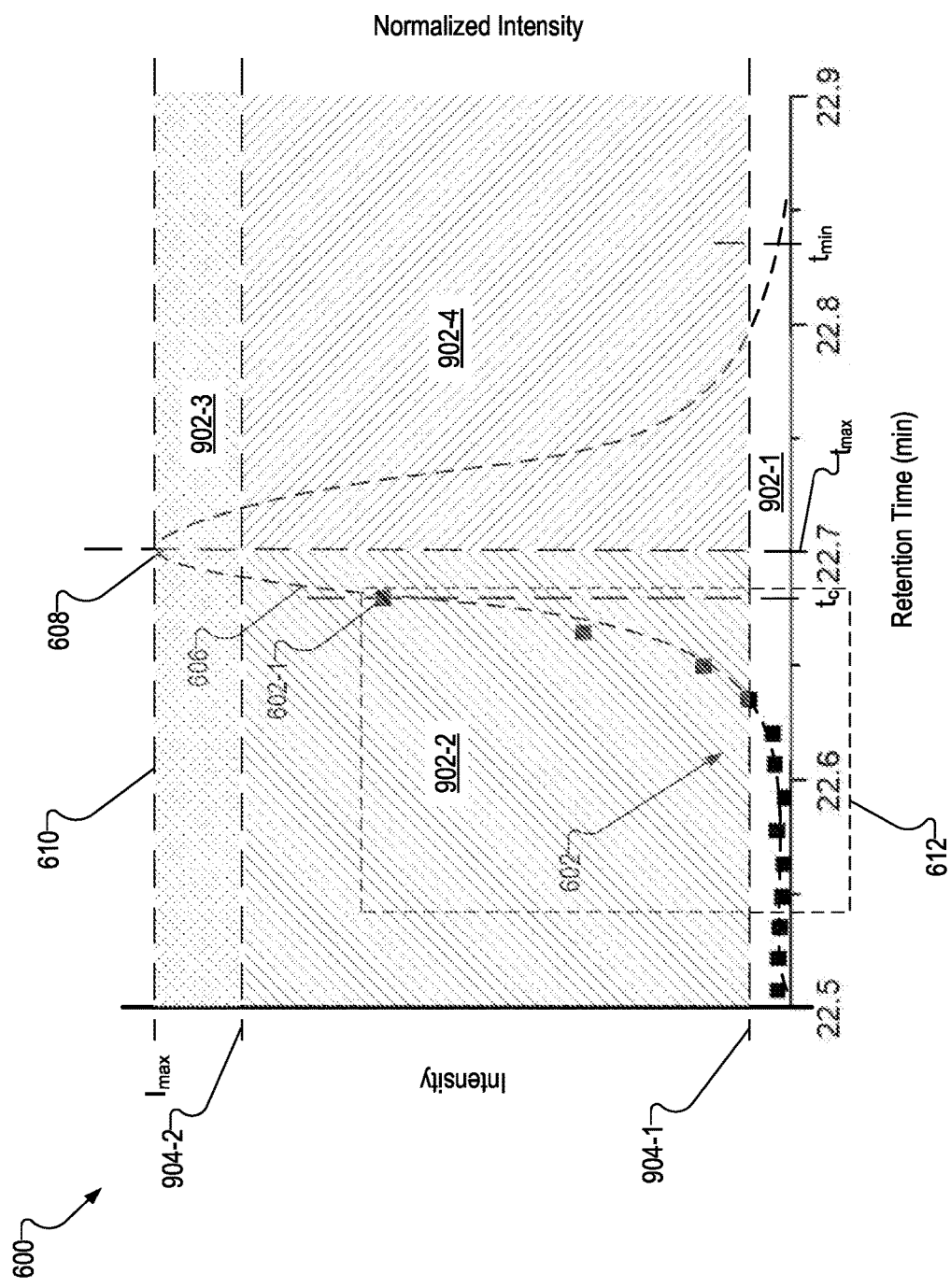
FIG. 9 shows an illustrative division of the elution profile of FIG. 7 into a plurality of distinct signal state regions based on normalized intensity values relative to a reference intensity point in the elution profile.

For example, a current signal state of an elution profile may have one of a plurality of distinct signal states. FIG. 9 shows an illustrative division of the elution profile of TIC 600 shown in FIG. 7 into a plurality of distinct signal state regions 902 (e.g., signal state regions 902-1 through 902-4) based on normalized intensity values relative to a reference intensity point in the elution profile (e.g., apex 608). For example, a baseline region 902-1 is located below a first threshold normalized intensity value 904-1 (e.g., 0.1) both before and after detection of apex 608. A rising region 902-2 is located between first threshold normalized intensity value 904-1 and a second threshold normalized intensity value 904-2 (e.g., 0.8) and prior to detection of apex 608. An apex region 902-3 is located above the second threshold normalized intensity value 904-2 and both before and after detection of apex 608. A falling region 902-4 is located between second threshold normalized intensity value 904-2 and first threshold normalized intensity value 904-1 and after detection of apex 608. While FIG. 9 shows four distinct signal state regions 902, any other suitable configuration and number of signal state regions may be used. For example, rising region 902-2 and falling region 902-4 may be based on different threshold normalized intensity values. Additionally, more or fewer than four signal state regions may be used (e.g., baseline region 902-1, rising region 902-2, apex region 902-3, and/or falling region 902-4 may each be divided into multiple different regions).

System 400 may identify a signal state associated with the estimated relative position of selected detection point 602-1 by identifying a signal state region 902 in which selected detection point 602-1 is located. For example, system 400 may compare the normalized intensity value of selected detection point 602-1 with a table of signal state boundaries representative of signal state regions 902 to identify the current signal state associated with selected detection point 602-1. In the example of FIG. 9, system 400 may determine that selected detection point 602-1 is located within rising region 902-2 and thus classify the current signal state as a rising signal state. In some examples, system 400 may apply set 612 to signal state model 514, which may classify selected detection point 602-1 according to the signal state region 902 in which selected detection point 602-1 is located.

Figure 10:
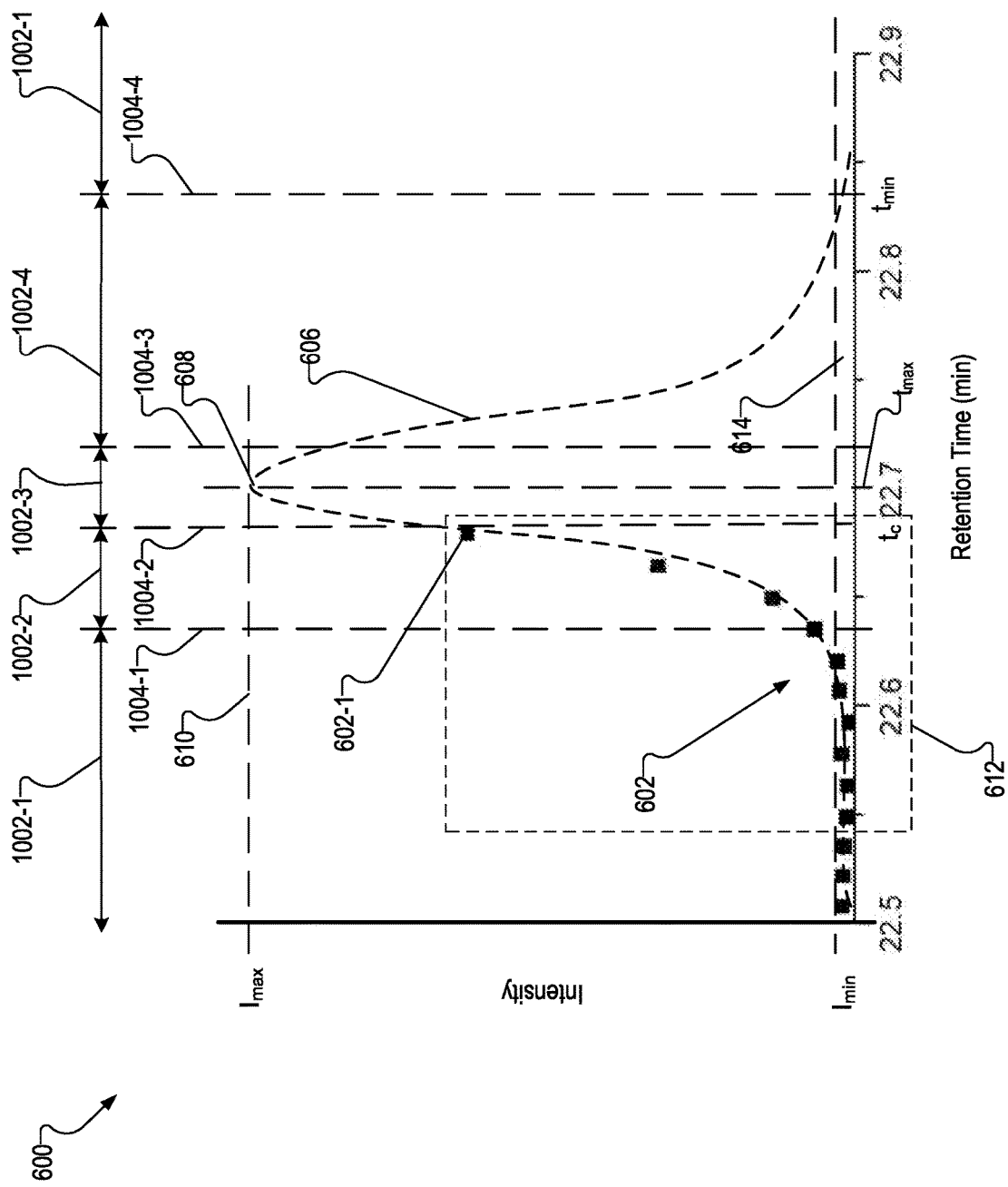
FIG. 10 shows another illustrative division of the elution profile of the TIC shown in FIG. 7 into distinct signal state regions based on time and relative to a temporal reference point in the elution profile.

In other examples, when the relative position of selected detection point 602-1 is the temporal distance to a temporal reference point (e.g., expected time $t_{max}$), system 400 may identify the current signal state of the ion signal based on the estimated relative position of selected detection point 602-1. FIG. 10 shows an illustrative division of the elution profile of TIC 600 shown in FIG. 7 into distinct signal state regions 1002 (e.g., regions 1002-1 through 1002-4) based on time and relative to a temporal reference point in the elution profile (e.g., expected time $t_{max}$). While FIG. 10 shows four distinct signal state regions 1002, any other suitable number of signal state regions may be used.

As shown, a baseline region 1002-1 is located prior to a first threshold temporal distance 1004-1 before expected time $t_{max}$ (e.g., 0.6 min). A rising region 1002-2 is located between first threshold temporal distance 1004-1 and a second threshold temporal distance 1004-2 before expected time $t_{max}$ (e.g., 0.2 min). An apex region 1002-3 is located between second threshold temporal distance 1004-2 and a third threshold temporal distance 1004-3 after expected time $t_{max}$ (e.g., 0.2 min). A falling region 1002-4 is located between third threshold temporal distance 1004-3 and a fourth threshold temporal distance 1004-4 after expected time $t_{max}$ (e.g., 1.4 min). The baseline region 1002-1 is also located after fourth threshold temporal distance 1004-4. The configuration of signal state regions 1002 shown in FIG. 10 is merely illustrative, as any other configuration may be used. For example, any one or more signal state regions 1002 may be defined relative to another reference point, such as an expected time $t_{min}$ at which the intensity value is expected to reach a minimum value $I_{min}$, as indicated by dashed line 614.

System 400 may identify a signal state of the ion signal of the elution profile by identifying a signal state region 1002 in which selected detection point 602-1 is located. For example, system 400 may compare the estimated temporal distance of selected detection point 602-1 with a table of signal state boundaries representative of signal state regions 1002 to identify the current signal state associated with selected detection point 602-1. In the example of FIG. 10, system 400 may determine that selected detection point 602-1 is located within rising region 1002-2 and thus classify the current signal state as a rising signal state. In some examples, system 400 may apply set 612 to signal state model 514, which may classify selected detection point 602-1 according to the signal state region 1002 in which selected detection point 602-1 is located.

Figure 11:
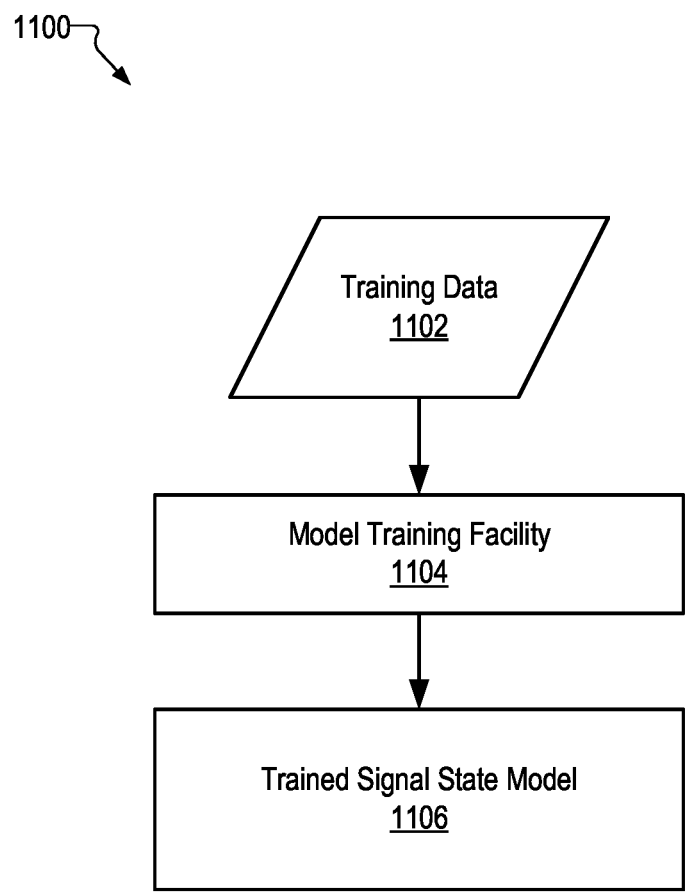
FIG. 11 shows an illustrative method for training a machine learning model that may implement a signal state model.

As mentioned, in some examples signal state model 514 comprises a machine learning model configured to estimate a relative position of a selected detection point relative to a reference intensity and/or time point and classify, based on the estimated relative position of the selected detection point, a current signal state of the ion signal of the elution profile. Illustrative methods of training a machine learning model will now be described. FIG. 11 illustrates a method 1100 for training a machine learning model that may implement signal state model 514. As shown, training data 1102 may be provided to a model training facility 1104, which may utilize the training data 1102 to train a signal state model 1106. The examples that follow describe training signal state model 1106 to estimate a normalized intensity value of a selected detection point and classify, based on the estimated normalized intensity value of the selected detection point, a current signal state of the ion signal of the elution profile. However, the same principles may be applied to train signal state model to classify the current signal state based on an estimated temporal distance of the selected detection point from a temporal reference point.

Model training facility 1104 may perform any suitable heuristic, process, and/or operation that may be configured to train a machine learning model. In some examples, model training facility 1104 may be implemented by hardware and/or software components (e.g., processors, memories, communication interfaces, instructions stored in memory for execution by the processors, etc.), such as storage facility 402 and/or processing facility 404 of system 400.

Signal state model 1106 may be any suitable type of machine learning model, such as a neural network model (e.g., a convolutional neural network (CNN)), a Boosted Decision Tree regression model, a Decision Forest regression model, a Fast Forest Quantile regression model, and an ordinal regression model.

Figure 12:
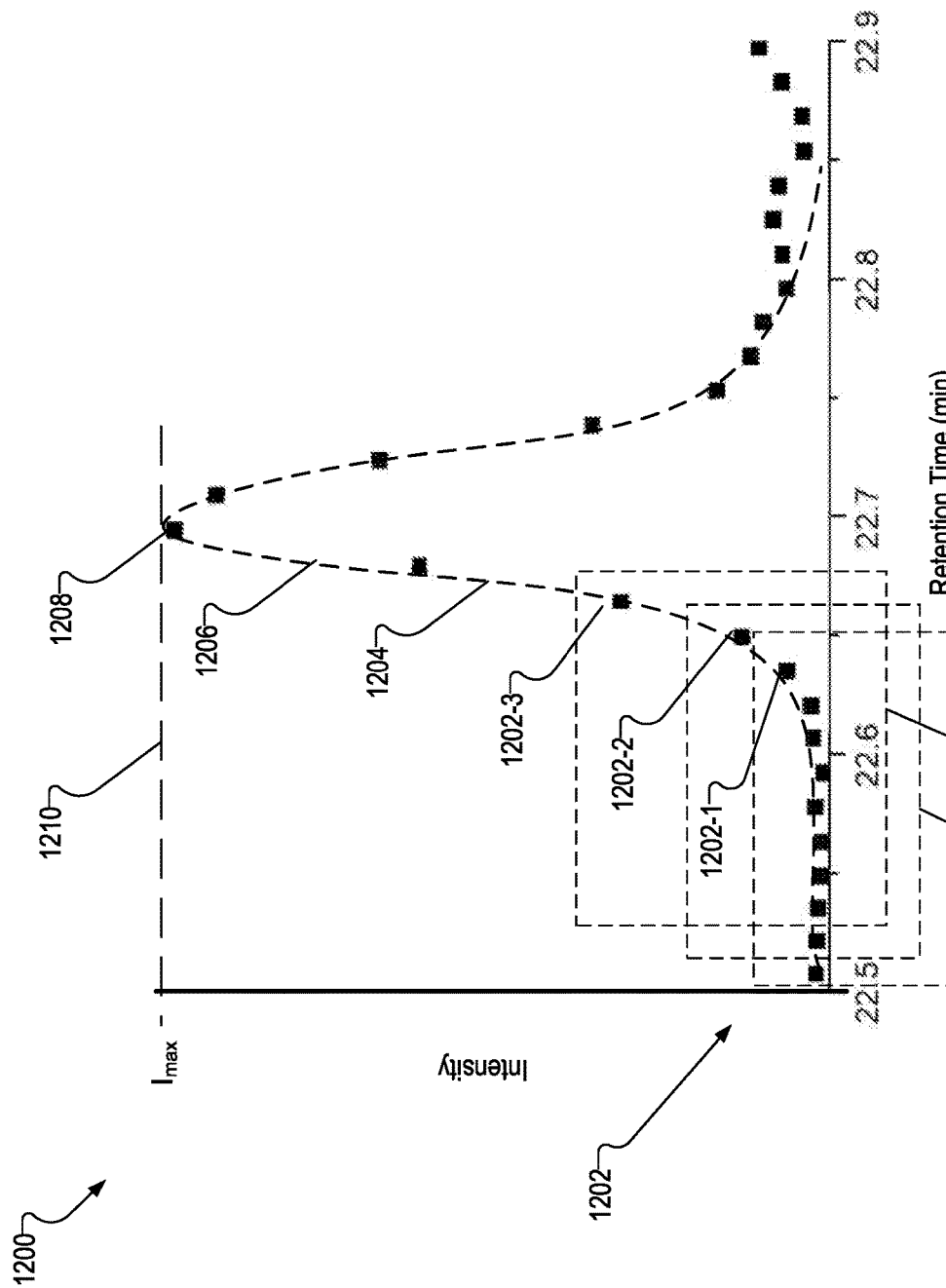
FIG. 12 shows an illustrative TIC that may be generated from, or is representative of, training data that may be used for training the machine learning model of FIG. 11.

Training data 1102 may be acquired or extracted from data representative of one or more elution profiles (e.g., a set of LC-MS detection points). FIG. 12 illustrates a data set that may be included in training data 1102. FIG. 12 shows an illustrative TIC 1200 that may be generated from, or is representative of, data acquired from a LC-MS system 100. It will be recognized that signal state model 1106 may be trained based on TIC 1200 source data without generating TIC 1200. As shown, TIC 1200 plots a plurality of detection points 1202 each representing a detected intensity value, as detected by a mass spectrometer during full-spectrum acquisitions, and retention time (min). Each successive acquisition adds a new detection point 1202 to TIC 1200. Detection points 1202 together form an elution profile 1204 of the components eluting from column 110. Elution profile 1204 includes a peak 1206 having an apex 1208 at which a detected intensity is at a maximum intensity value $I_{max}$, as indicated by dashed line 1210.

Training of signal state model 1106 is based on the principle that the normalized intensity value or temporal distance of a selected detection point 1202 (e.g., a ratio of the detected intensity value of the selected detection point 1202 to a known reference intensity value, such as $I_{max}$) is a function of the detected intensity levels of one or more historical detection points 1202 from the same experiment. Accordingly, training data 1102 applied to model training facility 1104 comprises a series of input vectors, each input vector having detected intensity values for a distinct set of detection points 1202. Each input vector may comprise any distinct set of detection points 1202 as may serve a particular implementation. For example, a first input vector may comprise detected intensity values for a first set 1212-1 of detection points 1202, a second input vector may comprise intensity values for a second set 1212-2 of detection points 1202, a third input vector may comprise intensity values for a third set 1212-3 of detection points 1202, and so on.

In the example of FIG. 12, each input vector includes intensity values for ten detection points 1202. However, each input vector may include intensity values for any other suitable number of detection points 1202 (e.g., 6, 12, 24, etc.). Alternatively, each input vector may include intensity values for all detection points 1202 included in one or more prior input vectors.

In some examples, detection points 1202 may not be evenly spaced along the time axis. To simplify training of signal state model 1106, detection points 1202 may be corrected (such as by interpolation) to a fixed and uniform time spacing (e.g., 1 second).

Any number of input vectors may be applied to model training facility 1104. In some examples, the number of input vectors is selected so as to encompass at least a full half-width of peak 1206. In the example of FIG. 12, five input vectors having intensity values for ten detection points each would encompass at least a full half-width of peak 1206. Alternatively, the number of input vectors may be selected so as to encompass a full width of peak 1206. Input vectors that encompass the full width of peak 1206 may be used to train signal state model 1106 to estimate an expected time $t_{min}$ at which the intensity value of a peak is expected to reach a baseline level.

A particular detection point 1202 is selected for each input vector as a selected detection point. Any detection point 1202 included within each respective input vector may be selected. In the examples that follow, the selected detection point 1202 for each input vector is the right-most (most recent) detection point 1202 included in the respective input vector. For example, the first input vector includes detection point 1202-1 as the selected detection point, the second input vector includes detection point 1202-2 as the selected detection point, and the third input vector includes detection point 1202-3 as the selected detection point. In alternative examples, the selected detection point 1202 is not the right-most detection point but may be any other suitable detection point (e.g., detection point 1202-1 is the selected detection point for the second input vector defined by set 1212-2, detection point 1202-2 is the selected detection point for the third input vector defined by set 1212-3, etc.).

Training data 1102 also includes the known desired output values from signal state model 1106. The known desired output values comprise the normalized intensity values of each selected detection point 1202 for each input vector (or the temporal distance values of each selected detection point 1202 for each input vector). The normalized intensity values are known because the reference intensity value (e.g., $I_{max}$) is known. The known output values may be used for supervised training of signal state model 1106.

To simplify training of signal state model 1106, detection points 1202 may in some examples be corrected based on the known reference intensity value. That is, the detected intensity value of each detection point 1202 may be normalized based on the known reference value.

In the examples described above, the reference intensity value is the expected maximum intensity value $I_{max}$ at apex 1208 of peak 1206. However, any other normalization scheme may be used, and the reference intensity value may be any other suitable reference value, such as a known running average intensity value, a global maximum intensity value, a recent maximum intensity value, etc. In some examples, the normalization scheme may include a baseline slope and/or a baseline level correction. For example, the normalized intensity value may be determined as the ratio of the difference between the current intensity value $I_c$ and the baseline intensity value $I_{min}$ to the difference between the expected maximum intensity value $I_{max}$ and the baseline intensity value $I_{min}$ $((I_c-I_{min})/(I_{max}-I_{min}))$.

In some examples, training data 1102 may be split into two sets of data, such that a first set of training data may be used for training signal state model 1106 and a second set of training data may be used to score signal state model 1106. For example, training data 1102 may be split so that a first percentage (e.g., 75%) of the input vectors may be used as the training set for training signal state model 1106, and a second percentage (e.g., 25%) of the input vectors may be used as the scoring set to generate an accuracy score for signal state model 1106.

During a training phase, model training facility 1104 may run one or more sessions to train signal state model 1106 based on training data 1102 to estimate a normalized intensity value of a selected detection point 1202. Model training facility 1104 may also run one or more sessions to train signal state model 1106 based on training data 1102 to estimate a temporal distance of the selected detection point to a reference time, e.g., an expected time $t_{max}$ at which the intensity value of an elution profile is expected to reach maximum intensity value (e.g., an apex of the elution profile) and/or an expected time $t_{min}$ at which the intensity value of the elution profile is expected to reach a baseline intensity value. Model training facility 1104 may also run one or more sessions to train signal state model 1106 based on training data 1102 to estimate a signal state region in which the selected detection point is located. Model training facility 1104 may use any suitable machine learning technology or algorithm to perform operations to facilitate learning, by a machine learning model, of how to fit the machine learning model to the detected intensity values within the first set of training data 1102.

Completion of a training phase, by model training facility 1104, may result in trained signal state model 1106 that is configured to estimate a relative position of a selected detection point and classify a current signal state of the ion signal. The trained signal state model 1106 may be stored in a data store, such as storage facility 402, and may be executed during runtime by any suitable computing component, including processing facility 404.

If data for multiple different chromatography conditions is acquired from survey acquisitions with a period short enough to characterize the chromatographic peaks (the Nyquist limit), trained signal state model 1106 may be applicable to experimental data sets that may use different chromatography conditions and have different peak widths. The Nyquist limit for a Gaussian curve is six points. Thus, if training data 1102 includes six detection points across a chromatographic peak, interpolation to a fixed time spacing between the sampled points could be robust.

In alternative examples, signal state model 1106 may be trained based on training data 1102 configured for a specific application, such as a selected m/z range, specific chromatographic conditions, a specific sample type, etc. In such examples, signal state model 1106 could be trained after acquiring data for an initial priming experiment, and signal state model 1106 could be used thereafter only for subsequent iterations of that specific experiment.

In some examples, signal state model 1106 may be refined or further trained in real time (e.g., during an experiment), such as if it is found that estimated normalized intensity values or estimated temporal distances are deviating significantly (e.g., by a predetermined amount) from the actual values (which may be subsequently detected as the experiment progresses).

Figure 13:
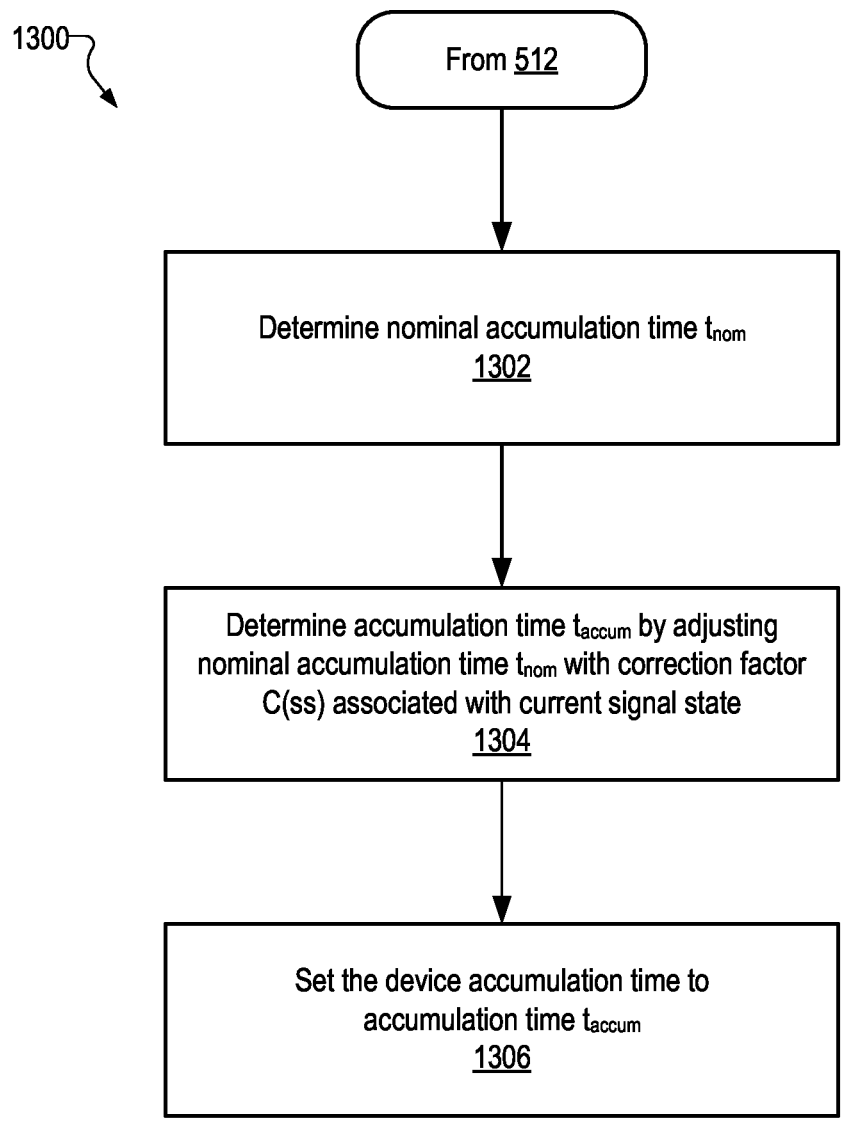
FIG. 13 shows an illustrative method of setting the accumulation time based on the current signal state of the ion signal of the elution profile.

Illustrative embodiments of performing operation 516 of method 500 (see FIG. 5) will now be described with reference to FIG. 13. FIG. 13 shows an illustrative method 1300 of setting the accumulation time based on the current signal state of the ion signal of the elution profile. While FIG. 13 shows illustrative operations according to one embodiment, other embodiments may omit, add to, reorder, and/or modify any of the operations shown in FIG. 13. One or more of the operations shown in FIG. 13 may be performed by LC-MS system 100 and/or system 400, any components included therein, and/or any implementations thereof.

In operation 1302, system 400 determines a nominal accumulation time $t_{nom}$ based on the ion flux at the selected detection point and then corrects the nominal accumulation time $t_{nom}$ with a correction factor associated with the current signal state of the ion signal of the elution profile to obtain the accumulation time $t_{accum}$. The nominal accumulation time $t_{nom}$ may be determined by the following Equation (1):

$$t_{nom} = \frac{\text{target}}{\text{ion flux}} \quad (1)$$

where $t_{nom}$ is the nominal accumulation time for the next acquisition, target is the target number of ions to be accumulated in the next acquisition, and ion flux is the ion flux measured at the selected detection point (in units of ions per unit time). The target is previously determined, as explained above, based on characteristics of the device (e.g., space charge capacity), experiment conditions, and/or method parameters.

In operation 1304, system 400 determines the accumulation time $t_{accum}$ by adjusting the nominal accumulation time $t_{nom}$ with a correction factor C(ss) that is associated with the current signal state (ss) classified in operation 512, in accordance with the following Equation (2):

$$t_{accum} = t_{nom} * C(ss) \quad (2)$$

where C(ss) is the correction factor associated with the current signal state, such as a baseline state correction factor $C_{base}$, a rising state correction factor $C_{rising}$, an apex state correction factor $C_{apex}$, or a falling state correction factor $C_{falling}$. The value of each correction factor C(ss) is set to prevent overshooting or undershooting the target number of ions to be accumulated. For example, the baseline state correction factor $C_{base}$ may be approximately 1.0, the rising state correction factor $C_{rising}$ may be less than 1.0, the apex state correction factor $C_{apex}$ may be approximately 1.0, and the falling state correction factor $C_{falling}$ may be greater than 1.0.

In operation 1306, system 400 sets the accumulation time for the device (e.g., ion accumulator 204 and/or mass analyzer 206) as the accumulation time $t_{accum}$ determined in operation 1304.

Figure 14:
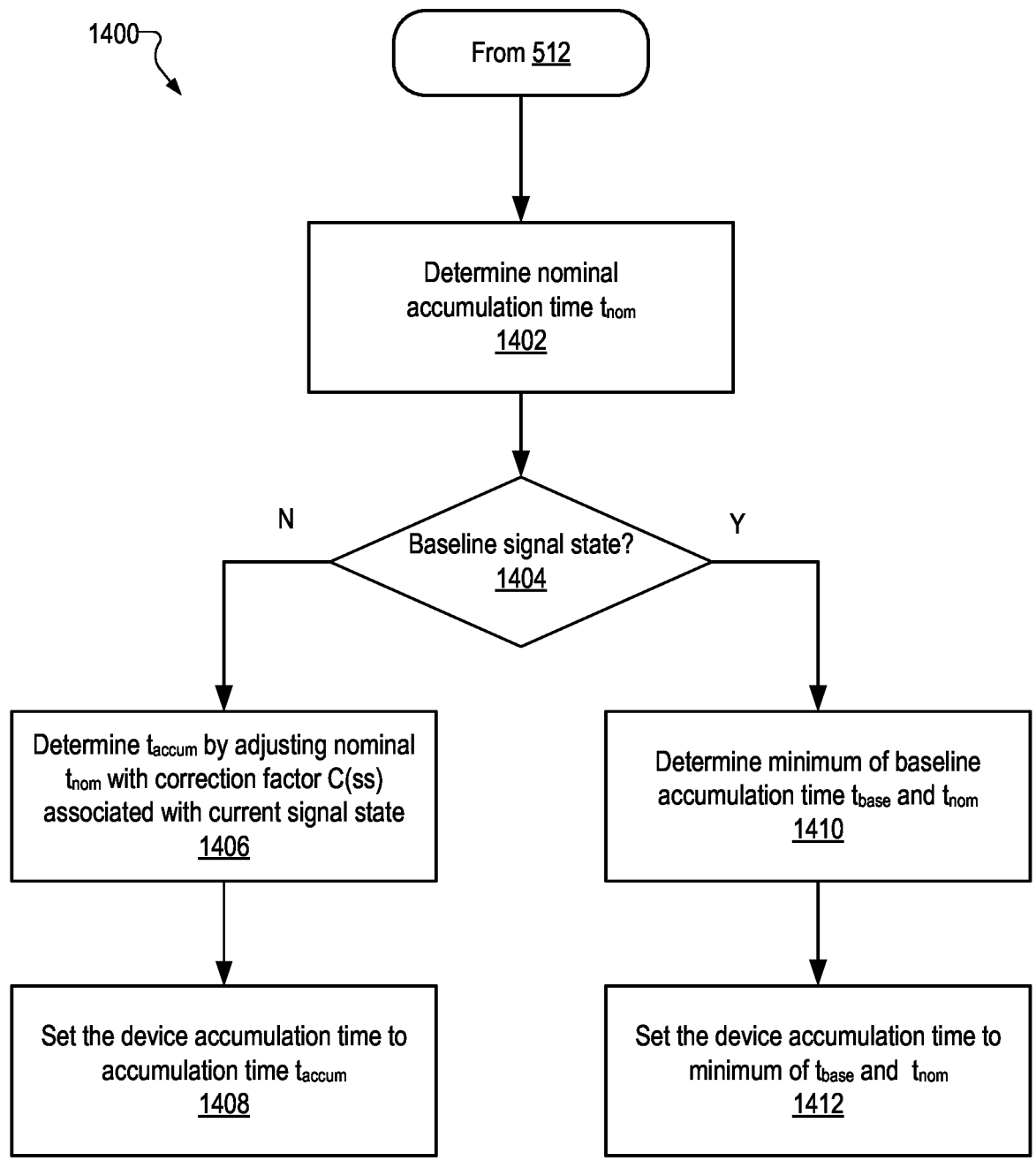
FIG. 14 shows another illustrative method of setting the accumulation time based on the current signal state of the ion signal of the elution profile.

FIG. 14 shows another illustrative method 1400 of setting the accumulation time based on the current signal state of the ion signal of the elution profile. While FIG. 14 shows illustrative operations according to one embodiment, other embodiments may omit, add to, reorder, and/or modify any of the operations shown in FIG. 14. One or more of the operations shown in FIG. 14 may be performed by LC-MS system 100 and/or system 400, any components included therein, and/or any implementations thereof. Method 1400 is similar to method 1300 except that, in method 1400, the accumulation time $t_{accum}$ during a baseline state is not adjusted by a correction factor C(ss).

In operation 1402, system 400 determines the nominal accumulation time $t_{nom}$. Operation 1402 may be performed in any suitable way, such as in the manner described for operation 1302.

In operation 1404, system 400 determines whether the current signal state classified in operation 512 (see FIG. 5) is a baseline signal state. If the current signal state is not a baseline signal state, processing proceeds to operations 1406 and 1408.

In operations 1406 and 1408, system 400 determines the accumulation time $t_{accum}$ and sets the device accumulation time to accumulation time $t_{accum}$. Operations 1406 and 1408 may be performed in any suitable way, such as in the manner described for operations 1304 and 1306, respectively.

If the current signal state is a baseline signal state, processing proceeds to operation 1410. In operation 1410, system 400 determines the minimum of a constant baseline accumulation time $t_{base}$ (e.g., 30 milliseconds) and the nominal accumulation time $t_{nom}$, as given by the following Equation (3):

$$t_{accum} = \min(t_{base}, t_{nom}) \qquad (3)$$

As explained above, the baseline accumulation time $t_{base}$ may be determined previously and may be configured to produce a target population of accumulated ions. The baseline accumulation time $t_{base}$ may be determined empirically or manually or by optimization, as will be described below in more detail.

In operation 1412, the accumulation time $t_{accum}$ is set to the minimum of the baseline accumulation time $t_{base}$ and the nominal accumulation time $t_{nom}$. Setting the accumulation time $t_{accum}$ to the minimum of the baseline accumulation time $t_{base}$ and the nominal accumulation time $t_{nom}$ during the baseline state provides a balance between sensitivity (e.g., ensuring enough ions are accumulated) and not overshooting the target number of ions. Since the baseline accumulation time $t_{base}$ regulates the initial ion flux, the baseline accumulation time $t_{base}$ can be set to manage or prevent overshooting, such as if the current signal state is incorrectly classified as a baseline state when the elution profile is actually in a rising state. In this scenario, setting the baseline state to be less than the nominal accumulation time $t_{nom}$ can prevent (or at least reduce) overshooting the target.

The correction factor C(ss) associated with each signal state and used in methods 1300 and 1400 may be determined in any suitable way. In some examples, each correction factor C(ss) is determined empirically, iteratively, or by a suitable algorithm (e.g., an optimization algorithm, a machine learning model, a neural network, etc.). In some examples, as will now be described with reference to FIGS. 15 and 16, correction factors C(ss) are determined based on principles borrowed from reinforcement learning in which an action to be taken by an agent is determined by a reward policy given a particular state. Here, the agent is system 400, the action to be taken is setting the accumulation time $t_{accum}$, and the state is the current signal state of the ion signal in the elution profile.

Figure 15:
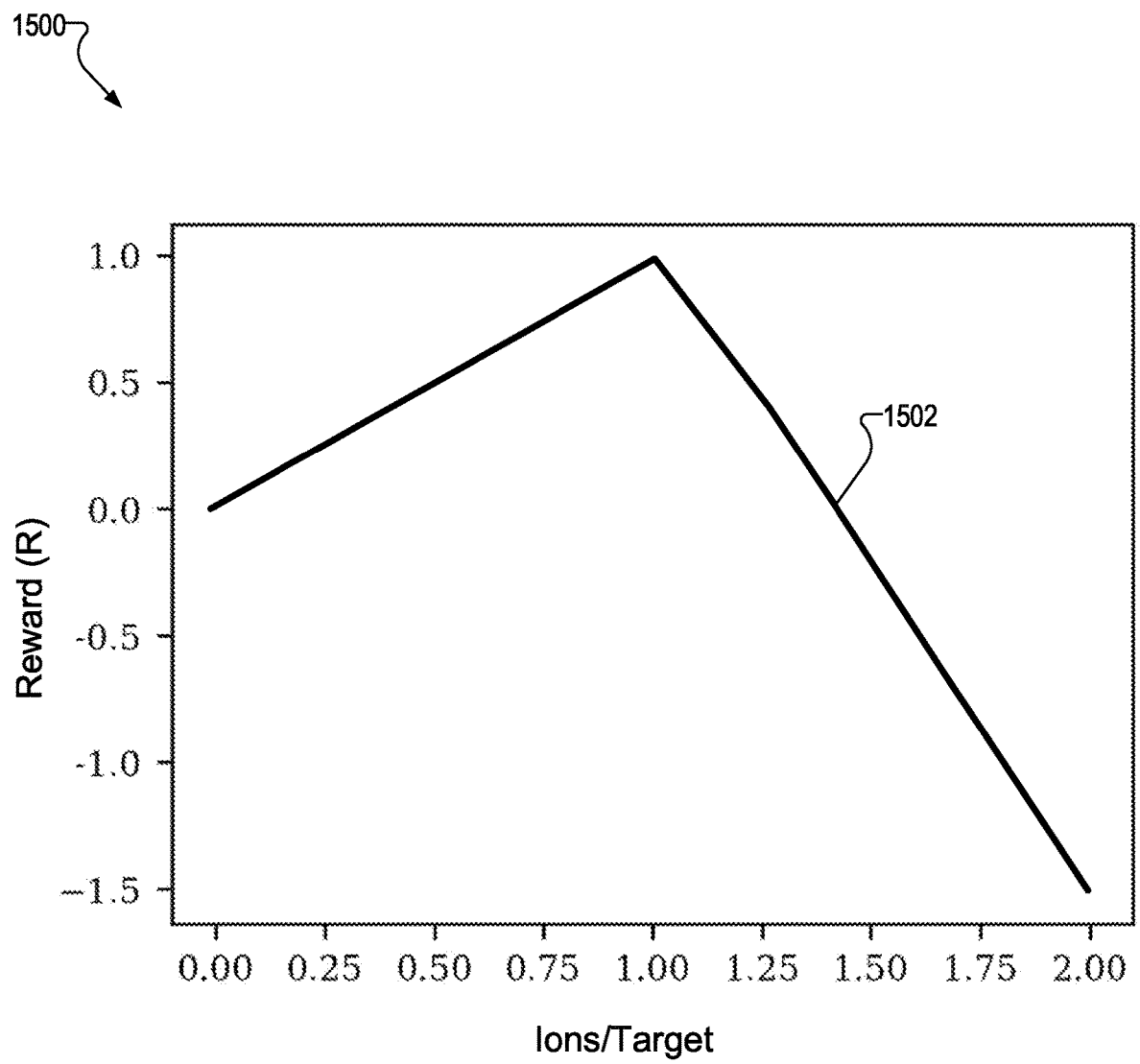
FIG. 15 shows an illustrative reward policy that may be used to determine correction factors associated with a plurality of distinct signal states.

FIG. 15 shows a graph 1500 of an illustrative reward policy 1502 that may be used to determine the correction factors C(ss) for each signal state. Graph 1500 plots a reward R as a function of an ion/target ratio (the ratio of the actual number of accumulated ions to the target number of accumulated ions). In this example, the reward R is assigned a value ranging from −1.5 to 1.0 depending on the value of the ion/target ratio, with a maximum reward (a value of 1.0) occurring when the ion/target ratio is 1.0 (e.g., when the actual number of accumulated ions is the same as the target number of accumulated ions). However, the reward R may be assigned any other value as may suit a particular implementation.

As can be seen in FIG. 15, the slope of the reward policy 1502 is steeper for ion/target ratios greater than 1.0 than for ion/target ratios less than 1.0, thereby penalizing overshooting the target more than undershooting the target since accumulating too many ions results in space-charge effects such as mass shifts, peak broadening, and coalescence. For example, with reward policy 1502, undershooting the target by 25% results in a reward of about 0.75 while overshooting the target by 25% results in a reward of about 0.4. It will be recognized that reward policy 1502 (e.g., the shape, slope, values of reward R, etc.) may be modified as desired, and may be tailored for the specific attributes of the instrument (e.g., the ion capacity of ion accumulator 204 or mass analyzer 206), the particular assay (e.g., number of target analytes, shape of peaks in the elution profile (e.g., Gaussian, non-Gaussian, etc.)), and/or experiment conditions. Generally, reward policy 1502 is based on characteristics of the measurement system, such as how costly it is to overfill the analyzer.

In some embodiments, a separate validation metric could be used to optimize reward policy 1502. For example, the validation metric could be a determination of the dynamic range of quantification for a series of analytes, using experimental or simulated data. This validation metric could be used to inform decisions about the shape and configuration of reward policy 1502.

Reward policy 1502 may be used to determine values of the correction factors C(ss). As explained above, the actual number of ions that are accumulated is based on the ion flux and the accumulation time $t_{accum}$, which depends on the correction factors C(ss), as shown by Equation (2) above. Correction factors C(ss) may be determined by optimizing the reward (as determined by reward policy 1502) over the entire elution profile and, hence, over all states. The reward may be optimized by obtaining a set of correction factors C(ss) (e.g., the set of $C_{base}$, $C_{rising}$, $C_{apex}$, and $C_{falling}$) that results in an optimum reward (e.g., an optimum total reward, an optimum average reward, etc.) over the entire elution profile or over a portion of interest of the elution profile.

As used herein, "optimize" and its variants means to seek an improved or optimum solution among a set of possible solutions, although the best solution may not necessarily be obtained, such as when an optimization process is terminated prior to finding the best solution, when multiple solutions exist that satisfy predefined criteria, when a solution satisfies minimum criteria, or when a selected optimization technique is unable to converge on the best solution. Similarly, as used herein an "optimum" parameter (e.g., a "maximum" or "minimum" value of a parameter) means the solution obtained as the result of performing an optimization process, and thus may not necessarily be the absolute extreme value of the parameter (e.g., the absolute maximum or minimum), but still adjusts the parameter and results in an improvement.

In some examples, reward policy 1502 may be represented by a mathematical formula that can be used to optimize the reward using standard optimization techniques. In further examples, a machine learning model (e.g., a neural network) or an optimization algorithm (e.g., a genetic algorithm) may be used to optimize the reward, such as by performing a multi-dimensional optimization to optimize multiple correction factors C(ss) simultaneously.

In another approach, the reward is optimized by a one-dimensional optimization (e.g., a 1D line search) in which the optimum value for each correction factor C(ss) is determined independently of the other correction factors C(ss). The optimum value of a particular correction factor C(ss) (e.g., correction factor $C_{rising}$) is the value of that correction factor C(ss) that produces an optimum reward over the entire elution profile. To determine the optimum value of a particular correction factor C(ss) using this approach, multiple episodes are run. Each episode is run by acquiring a series of mass spectra, such as by performing analytical scans, using method 500 described above with a particular set of correction factors C(ss). The particular correction factor C(ss) to be optimized is varied across different episodes while the other correction factors C(ss) are maintained at a constant value over all of the episodes. The constant value of the other correction factors C(ss) may be estimated or determined previously by this 1D line search optimization approach. For each episode, the rewards R for all acquisitions are determined by reward policy 1502 and summed to produce a total reward. The optimum value of the particular correction factor C(ss) is the value that produces the optimum total reward for the elution profile. This approach for optimization of the reward may be represented by the following Equation (4):

$$R(opt) = \max_{C=\{C_{base}, C_{rising}, C_{falling}, C_{peak}\}} \sum_{t=0}^{R} R(ss_t) \quad (4)$$

where R(opt) is the optimized reward, $R(ss_t)$ is the reward for each acquisition in an episode as determined by reward policy 1502, which is a function of the particular signal state ss (and, hence, a particular correction factor C(ss)) at each time t.

Figure 16:
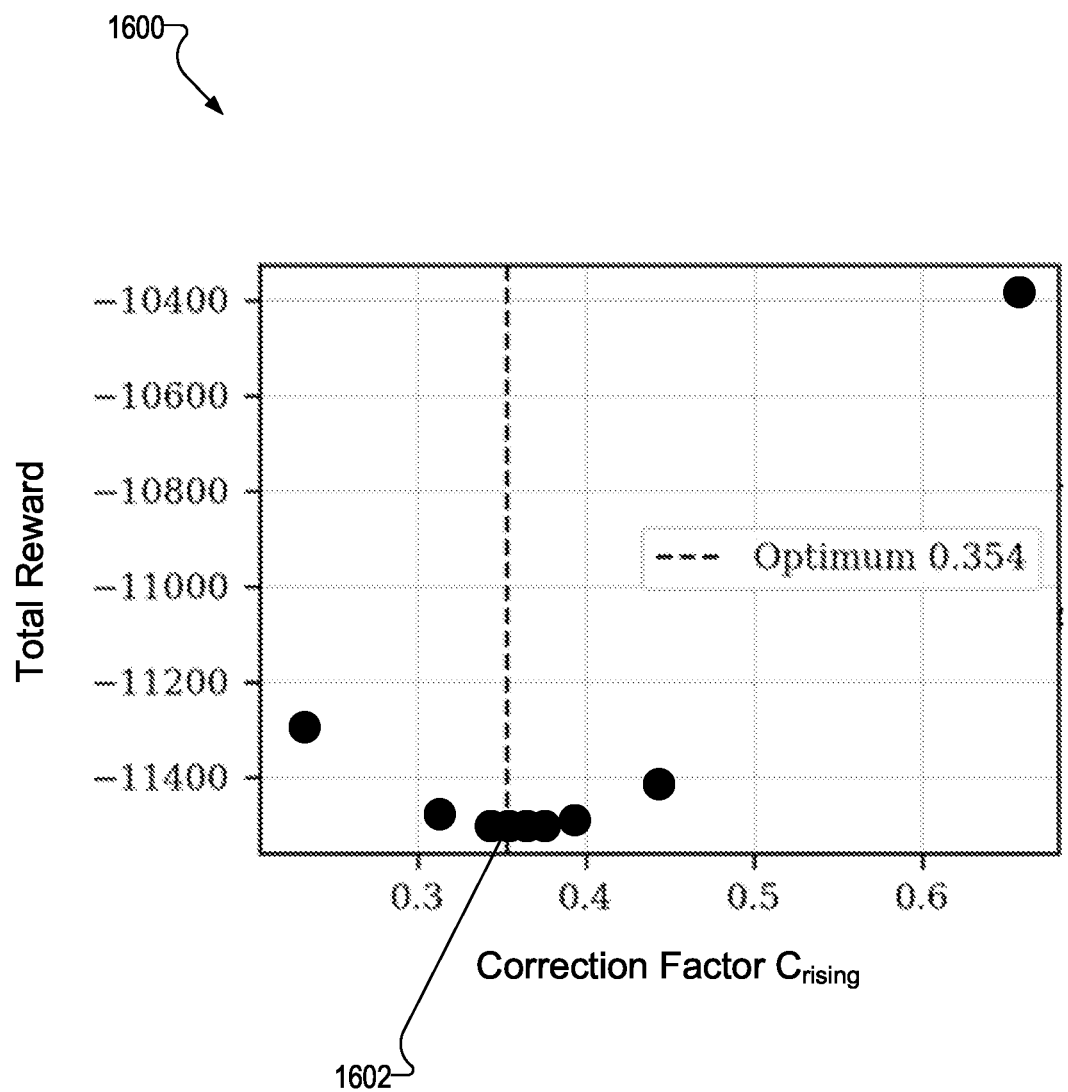
FIG. 16 shows an illustrative graph that plots the total reward, as determined by a reward policy, as a function of a correction factor $C_{rising}$ for a plurality of episodes.

Determination of an optimum value of $C_{rising}$ is illustrated with reference to FIG. 16. FIG. 16 shows an illustrative graph 1600 that plots the total reward for a plurality of episodes as a function of correction factor $C_{rising}$. Graph 1600 includes a plurality of points 1602 each representing a particular episode having a particular set of correction factors. In this example, points 1602 are generated by maintaining correction factors $C_{base}$, $C_{apex}$, and $C_{falling}$ each at a constant value for all episodes while varying correction factor $C_{rising}$ for each episode. The correction factor $C_{rising}$ may be varied manually or iteratively according to an algorithm that converges to a solution. In the example of FIG. 16 a minimization algorithm is used, so the total reward for each episode is multiplied by negative 1 (−1) (or reward policy 1502 could be inverted so that the optimum reward is −1.0). However, a maximization algorithm could be used without multiplying the total reward by −1. As shown in FIG. 16, in this example the minimum reward occurs when the value of correction factor $C_{rising}$ is 0.354. This value of correction factor $C_{rising}$ may then be used when running further episodes to independently optimize each of the other correction factors C(ss).

As mentioned above, in the example of method 1400, when the current signal state is a baseline state, system 400 sets accumulation time $t_{accum}$ as the minimum of a constant baseline accumulation time $t_{base}$ and the nominal accumulation time $t_{nom}$, as given by Equation (3) above, rather than by correcting the nominal accumulation time $t_{nom}$ with a baseline correction factor $C_{base}$, as given by Equation (2) above. In some examples, the baseline accumulation time $t_{base}$ is determined by optimizing the reward in a manner similar to optimizing the correction factors C(ss) described above. For example, multiple episodes may be run using different values of baseline accumulation time $t_{base}$ in Equation (3) but constant values of correction factors $C_{rising}$, $C_{apex}$, and $C_{falling}$ in Equation (2), which may be estimated or previously determined. In some examples, since the baseline accumulation time $t_{base}$ regulates ion flux and thus affects the values of correction factors $C_{rising}$, $C_{apex}$, and $C_{falling}$, the baseline accumulation time $t_{base}$ is optimized prior to optimizing the correction factors $C_{rising}$, $C_{apex}$, and $C_{falling}$.

In further examples, the baseline accumulation time $t_{base}$ is determined based on the number of target analytes in an experiment. For instance, system 400 may obtain, from a method file (which may be provided by a user), a list or number of target analytes and set the baseline accumulation time $t_{base}$ based on the number of target analytes to ensure that the accumulation time $t_{accum}$ is short enough to analyze all of the target analytes. System 400 may additionally set the baseline accumulation time $t_{base}$ to ensure that the accumulation time $t_{accum}$ is long enough to achieve sufficient sensitivity.

In the above examples, the reward is optimized according to Equation (4) by finding an optimum total reward over the entire episode. However, the reward may be optimized in any other suitable way, such as by finding an optimum average reward over the episode.

The systems and methods described above for ion population regulation use information about peak shapes and their distribution of intensities acquired previously during one or more training experiments. For example, training experiments may be performed to train signal state model 514, optimize the shape of reward policy 1502, and optimize the reward given by reward policy 1502 to determine the optimal correction factors C(ss), and/or optimal baseline accumulation time $t_{base}$.

In some examples, signal state model 514, reward policy 1502, and/or correction factors C(ss) may be trained and/or optimized for various different conditions. For example, by knowing information about the expected or predicted elution profile, the sampling frequency may also be optimized, such as by selecting a sampling frequency just above the Nyquist limit for the currently detected peak. By training on experimental data, signal state model 514, reward policy 1502, and the correction factors C(ss) are trained to handle various different peak shapes. In further examples, signal state model 514 may be trained to classify the current peak shape (e.g., Gaussian, non-Gaussian, etc.) and use the peak shape information to select an appropriate set of correction factors associated with that particular peak shape. In yet further examples, signal state model 514, reward policy 1502, and/or the correction factors C(ss) may be trained for particular experiment conditions, such as a specific flowrate (e.g., nanoflow, microflow, a range of flowrates, etc.), a particular assay, a target number of analytes, etc. In further examples, signal state model 514 may be applied and trained on actual intensity values rather than on normalized intensity values.

In some examples, training experiments may be eliminated or reduced by based on certain assumptions. For example, signal state model 514 could be trained and optimized for an average peak in an elution profile, such as a Gaussian-shaped peak, by using simulated data.

Signal state model 514, reward policy 1502, correction factors C(ss), and/or baseline accumulation time $t_{base}$ may also be scored and/or updated (e.g., re-trained or re-optimized) in real-time during an analytical experiment based on data acquired during the analytical experiment (e.g., based on analytical acquisitions or scans). At various times throughout an analytical experiment, system 400 may perform an assessment to assess the performance of the ion population regulation process (e.g., signal state model 514, reward policy 1502, the correction factors C(ss), and/or baseline accumulation time $t_{base}$) using analytical data already acquired up to that point. Assessments may be performed at any suitable time, such as periodically (e.g., every nth scan), randomly, or in response to a trigger event (e.g., an event indicating overfilling, such as detection of coalescence or peak broadening exceeding a threshold amount). Each assessment may assess the quality of signal state model 514, reward policy 1502, correction factors C(ss), and/or baseline accumulation time $t_{base}$.

For example, an assessment may assess whether any detection points were incorrectly classified (based on an estimated relative position of the detection point) by a comparison with the actual peak of the elution profile. If the quantity and/or extent of the misclassification(s) exceeds a threshold value, system 400 may retrain signal state model 514 using the acquired experimental data.

As another example, system 400 may determine how close the current correction factors C(ss) are to achieving rewards that would be achieved by "perfect" correction factors C(ss) and/or a perfect reward policy. To this end, system 400 may run episodes with the currently acquired data to optimize the reward of the current reward policy and use the resulting information to determine if the reward could be improved by changing the correction factors C(ss), baseline accumulation time $t_{base}$, and/or reward policy. If the currently applied correction factors C(ss), baseline accumulation time $t_{base}$, and/or reward deviate from "perfect" values by a threshold amount, system 400 may re-optimize the correction factors C(ss) and/or baseline accumulation time $t_{base}$ and/or select a more optimal reward policy for use during the analytical experiment.

If signal state model 514, reward policy 1502, correction factors C(ss), and/or baseline accumulation time $t_{base}$ are updated during an analytical experiment, the updated parameters may be used as the default parameters for the next experiment. In this way, the ion population regulation systems and methods can be re-trained and optimized on the fly without consuming additional time for re-training and optimization. The real-time assessment and updating process need not require input from the user, thereby improving convenience for the user.

In some examples, an analytical experiment may begin with no accumulation time corrections or adjustments and instead use conventional methods of ion population regulation, or the analytical experiment may use a signal state model and parameters (e.g., a reward policy, correction factors C(ss), and/or baseline accumulation time $t_{base}$) previously determined from other previously acquired data (e.g., training data, analytical experiments, simulated data, etc.). During the analytical experiment, a signal state model and parameters for the particular analytical experiment may be trained and determined in real-time by using data acquired during a first stage of the analytical experiment. In a second stage of the analytical experiment, system 400 may implement method 500, including the trained signal state model and determined parameters, to regulate the ion population. The second stage may begin after a threshold has been reached, such as a minimum number of peak elutions, a minimum time elapsed, detection of a particular analyte, a minimum total ion current, etc. The initial data for training the signal state model and determining the parameters to be applied, comprising data acquired in the first segment of the analytical experiment, may be small but useable, and may be refined in subsequent re-optimizations, as described above. In some examples, the signal state model and parameters may be refined and re-optimized based on data acquired during the second stage of the analytical experiment. If corrections or parameters applied during the second stage fall outside some threshold boundaries (e.g., an acceptable tolerance), system 400 may revert to using the conventional methods of ion population regulation or using a signal state model trained previously on other data not acquired during the analytical experiment.

Various modifications may be made to the systems and methods described herein without departing from the scope and principles of the concepts described herein. For instance, in the examples described above the training of a signal state model and estimation of a relative position of a selected detection point is based on a plurality of detection points (e.g., a TIC). In some modifications, training of a signal state model, estimation of a relative position of a selected detection point, and/or optimization of the reward may be based on the signals of multiple m/z values or a selected m/z (e.g., an XIC) and/or over less than the entire elution profile (e.g., a small time window of interest).

In some examples, system 400 may set the accumulation time $t_{accum}$ without determining the nominal accumulation time $t_{nom}$ and correcting the nominal accumulation time $t_{nom}$ with a correction factor C(ss). For example, system 400 may set the accumulation time $t_{accum}$ as a constant accumulation time value associated with each signal state similar to the constant baseline accumulation time $t_{base}$, such as a rising accumulation time $t_{rising}$, an apex accumulation time $t_{apex}$, and a falling accumulation time $t_{falling}$. Each of these constant accumulation times may be determined in any suitable way, such as empirically, manually, and/or by optimizing a reward policy, as explained above regarding the baseline accumulation time $t_{base}$.

In some examples, an elution profile may exhibit different characteristics at different times and thus may be associated with different reward policies and/or correction factors C(ss) or baseline accumulation time $t_{base}$ at different times. For example, different reward policies, correction factors C(ss), baseline accumulation time $t_{base}$, and/or sampling frequencies may be scheduled for use at different times during the elution profile or may be triggered upon the detection of certain signals (e.g., certain peak intensities, peak shapes, etc.).

In further examples, the principles described herein may be applied to regulation of ion population through a transmission-type instrument rather than in a trapping-type instrument that accumulates ions. In these examples, the term "injection time" refers to the period of time over which ions are injected into a device, such as a ToF mass filter or a quadrupole mass filter and may be used interchangeably with accumulation time. Some transmission-type instruments may additionally or alternatively use ion attenuation to regulate the intensity of the beam that hits the detector and thereby regulate the ion population. In these examples, the degree of ion attenuation may be optimized in a manner similar to optimization of injection time and may be optimized independently or together with optimization of injection time.

In additional modifications, a separation device (e.g., a liquid chromatograph, a gas chromatograph, a capillary electrophoresis device, etc.) and/or a mass spectrometer (e.g., mass spectrometer 104) may include or may be coupled with an ion mobility analyzer, and data acquired by the ion mobility analyzer may be used to train a signal state model and estimate a relative position of a selected detection point in a manner similar to the methods described above for data acquired by the mass spectrometer. For example, a first set of data acquired with an ion mobility analyzer and a mass analyzer may include a series of mass spectra including intensity values of ions produced from the sample components as a function of m/z and/or ion mobility of the ions (e.g., a collision cross-section (CCS) of the ions). A second set of data may be extracted from the first set of data. The extracted second set of data may include a plurality of detection points representing intensity, as detected by the mass analyzer, as a function of time for a selected m/z and/or a selected CCS or range of CCS. The second set of data may be used in any way described herein, such as to train a signal state model and/or to estimate a relative position of a selected detection point for the selected CCS or range of CCS.

In some examples, system 400 may be configured to request user input to manage or adjust settings of the ion population regulation processes. For example, system 400 may obtain, from a user, method settings, a list of target analytes, a selected m/z, and/or any other initial or default values of parameters associated with signal state model 514 and reward policy 1502. System 400 may also be configured to notify the user of certain changes, such as when the accumulation time $t_{accum}$ changes or changes by a threshold amount, or the need for changes, such as when an assessment indicates parameters should be adjusted.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 17:
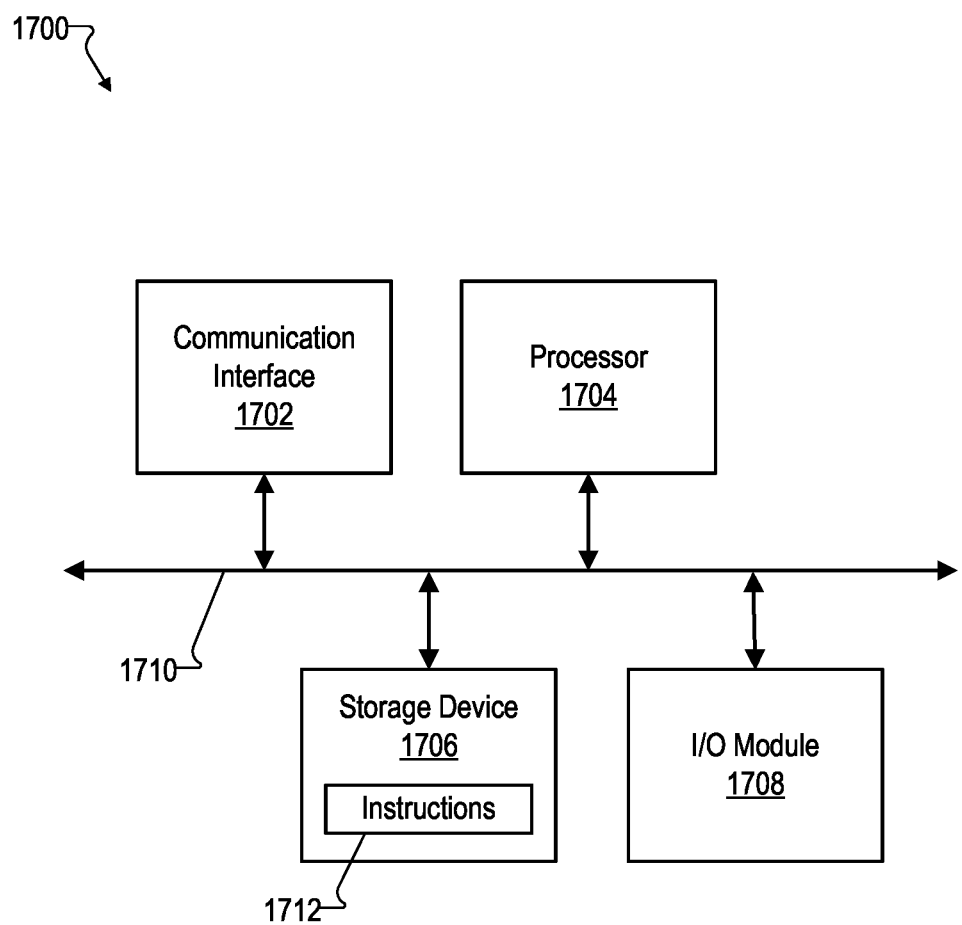
FIG. 17 shows an illustrative computing device.

FIG. 17 shows an illustrative computing device 1700 that may be specifically configured to perform one or more of the processes described herein. As shown in FIG. 17, computing device 1700 may include a communication interface 1702, a processor 1704, a storage device 1706, and an input/output ("I/O") module 1708 communicatively connected one to another via a communication infrastructure 1710. While an illustrative computing device 1700 is shown in FIG. 17, the components illustrated in FIG. 17 are not intended to be limiting. Additional or alternative components may be used in other embodiments. Components of computing device 1700 shown in FIG. 17 will now be described in additional detail.

Communication interface 1702 may be configured to communicate with one or more computing devices. Examples of communication interface 1702 include, without limitation, a wired network interface (such as a network interface card), a wireless network interface (such as a wireless network interface card), a modem, an audio/video connection, and any other suitable interface.

Processor 1704 generally represents any type or form of processing unit capable of processing data and/or interpreting, executing, and/or directing execution of one or more of the instructions, processes, and/or operations described herein. Processor 1704 may perform operations by executing computer-executable instructions 1712 (e.g., an application, software, code, and/or other executable data instance) stored in storage device 1706.

Storage device 1706 may include one or more data storage media, devices, or configurations and may employ any type, form, and combination of data storage media and/or device. For example, storage device 1706 may include, but is not limited to, any combination of the non-volatile media and/or volatile media described herein. Electronic data, including data described herein, may be temporarily and/or permanently stored in storage device 1706. For example, data representative of computer-executable instructions 1712 configured to direct processor 1704 to perform any of the operations described herein may be stored within storage device 1706. In some examples, data may be arranged in one or more databases residing within storage device 1706.

I/O module 1708 may include one or more I/O modules configured to receive user input and provide user output. One or more I/O modules may be used to receive input for a single virtual experience. I/O module 1708 may include any hardware, firmware, software, or combination thereof supportive of input and output capabilities. For example, I/O module 1708 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1708 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1708 is configured to provide graphical data to a display for presentation to a user. The graphical data may be representative of one or more graphical user interfaces and/or any other graphical content as may serve a particular implementation.

In some examples, any of the systems, computing devices, and/or other components described herein may be implemented by computing device 1700. For example, storage facility 402 may be implemented by storage device 1706, and processing facility 404 may be implemented by processor 1704.

It will be recognized by those of ordinary skill in the art that while, in the preceding description, various illustrative embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   obtaining, from a series of mass spectra including a most recent mass spectrum and a plurality of previously-acquired mass spectra, an elution profile comprising a plurality of detection points each representing intensity of ions accumulated over an accumulation time and detected by a detector as a function of time;
   classifying, based on a subset of detection points included in the plurality of detection points, a current signal state of the elution profile; and
   setting, for a next acquisition of a mass spectrum, the accumulation time based on the classified current signal state of the elution profile.

2. The method of claim 1, wherein:
   the obtaining of the series of mass spectra comprises obtaining the series of mass spectra by tandem mass spectrometry.

3. The method of claim 1, wherein the elution profile is based on a total ion current of each mass spectrum included in the series of mass spectra.

4. The method of claim 1, wherein classifying the current signal state of the elution profile comprises selecting a particular signal state from among a plurality of signal states.

5. The method of claim 4, wherein each signal state indicates how the intensity of the detected ions is currently changing over time.

6. The method of claim 5, wherein the plurality of signal states comprises a baseline state, a rising state, an apex state, and a falling state.

7. The method of claim 4, wherein the setting the accumulation time based on the classified current signal state of the elution profile comprises:
   determining a nominal accumulation time;
   identifying a correction factor associated with the classified current signal state of the elution profile; and
   correcting the nominal accumulation time based on the correction factor associated with the classified current signal state of the elution profile.

8. The method of claim 7, wherein the nominal accumulation time is determined based on a target population of ions divided by a current ion flux.

9. The method of claim 7, wherein the correction factor is configured to optimize a reward given by a reward policy.

10. The method of claim 7, wherein the correction factor is determined based at least in part on data obtained from the series of mass spectra.

11. The method of claim 1, wherein the current signal state of the elution profile is classified based on a relative position of a selected detection point included in the plurality of detection points, the relative position of the selected detection point representing a position of the selected detection point relative to an expected reference point in the elution profile.

12. The method of claim 11, wherein the selected detection point is derived from the most-recent mass spectrum.

13. The method of claim 11, wherein the relative position of the selected detection point comprises a normalized intensity value of the selected detection point, the normalized intensity value representing a ratio of the detected intensity value of the selected detection point to an expected maximum intensity value of the elution profile.

14. The method of claim 11, wherein the relative position of the selected detection point comprises a temporal distance of the selected detection point to an expected time point in the elution profile.

15. The method of claim 11, wherein the classifying the current signal state of the elution profile comprises applying a subset of the detection points to a trained machine learning model configured to estimate the relative position of the selected detection point based on the subset of detection points.

16. The method of claim 15, wherein the machine learning model is trained based at least in part on the plurality of detection points of the elution profile.

17. A method of performing mass spectrometry, comprising:
   acquiring a mass spectrum of ions accumulated over an accumulation time; and
   setting, for a next acquisition of a mass spectrum, the accumulation time based on a series of mass spectra including the mass spectrum and a plurality of previously-acquired mass spectra,
   wherein the setting of the accumulation time comprises applying, to a trained machine learning model, data derived from a subset of the group consisting of the previously-acquired mass spectra and the mass spectrum.

* * * * *